(12) United States Patent
Soulodre

(10) Patent No.: US 9,372,251 B2
(45) Date of Patent: Jun. 21, 2016

(54) SYSTEM FOR SPATIAL EXTRACTION OF AUDIO SIGNALS

(75) Inventor: Gilbert Arthur Joseph Soulodre, Kanata (CA)

(73) Assignees: Harman International Industries, Incorporated, Stamford, CT (US); Harman Becker Automotive Systems GmbH, Stamford, CT (US)

(*) Notice: Subject to any disclaimer, the term of this patent is extended or adjusted under 35 U.S.C. 154(b) by 444 days.

(21) Appl. No.: 12/897,709

(22) Filed: Oct. 4, 2010

(65) Prior Publication Data

US 2011/0081024 A1    Apr. 7, 2011

Related U.S. Application Data

(60) Provisional application No. 61/248,770, filed on Oct. 5, 2009.

(51) Int. Cl.
*H04R 5/00* (2006.01)
*G01S 3/80* (2006.01)
(Continued)

(52) U.S. Cl.
CPC .............. *G01S 3/8006* (2013.01); *H04S 7/30* (2013.01); *H04S 3/008* (2013.01); *H04S 5/005* (2013.01); *H04S 2400/01* (2013.01); *H04S 2400/11* (2013.01); *H04S 2400/15* (2013.01)

(58) Field of Classification Search
CPC ...................................................... H04S 5/005
USPC ........... 700/94; 706/22; 702/190; 381/17, 18, 381/58, 63, 66, 304, 310
See application file for complete search history.

(56) References Cited

U.S. PATENT DOCUMENTS 4,066,842 A    1/1978  Allen ............................. 179/1 P
4,118,599 A   10/1978  Iwahara et al. ............... 179/1 G
(Continued)

FOREIGN PATENT DOCUMENTS

CN    1419686 A    5/2003
CN    1662907 A    8/2005
(Continued)

OTHER PUBLICATIONS

Wang, David L., Lim, Jae S., The Unimportance of Phase in Speech Enhancement, IEEE Transactions on Acoustics, Speech, and Signal Processing, vol. ASSP-30, No. 4, Aug. 1982, 3 pgs.
(Continued)

*Primary Examiner* — Duc Nguyen
*Assistant Examiner* — Kile Blair
(74) *Attorney, Agent, or Firm* — Brooks Kushman P.C.

(57) ABSTRACT

A sound processing system receives an audio input signal that includes at least two different input channels of audio content. The sound processing system dissects the audio input signal to separate sources of audible sound included in the audio input signal into sound source vectors. Separation of the sources of audible sound into sound source vectors may be based on a perceived location of each of the sources of audible sound within a listener perceived sound stage. The sound source vectors may represent spatial slices across the listener perceived sound stage that may be individually and independently processed with the sound processing system. Following processing, the sound source vectors may be selectively assembled to form an audio output signal having output channels used to drive respective loudspeakers. Since the sources of audible sound are separated and independent, the audible sound sources may be included on any one or more of the output channels.

38 Claims, 12 Drawing Sheets

(51) Int. Cl.
*H04S 7/00* (2006.01)
*H04S 5/00* (2006.01)
*H04S 3/00* (2006.01)

(56) References Cited

U.S. PATENT DOCUMENTS

| | | | |
|---|---|---|---|
| 4,159,397 A | 6/1979 | Iwahara et al. | 179/1 GQ |
| 4,829,574 A | 5/1989 | Dewhurst et al. | 381/41 |
| 4,912,767 A | 3/1990 | Chang | 381/47 |
| 5,068,897 A | 11/1991 | Yamato et al. | 381/24 |
| 5,210,366 A | 5/1993 | Sykes | 84/616 |
| 5,210,802 A | 5/1993 | Aylward | 381/61 |
| 5,285,503 A | 2/1994 | Satoh et al. | 381/109 |
| 5,303,307 A | 4/1994 | Elko et al. | 381/92 |
| 5,305,386 A | 4/1994 | Yamato | 381/1 |
| 5,386,478 A | 1/1995 | Plunkett | 381/103 |
| 5,394,472 A | 2/1995 | Broadie | 381/1 |
| 5,440,639 A | 8/1995 | Suzuki et al. | 381/17 |
| 5,491,754 A | 2/1996 | Jot et al. | 381/63 |
| 5,511,129 A | 4/1996 | Craven et al. | 381/103 |
| 5,568,558 A | 10/1996 | Ramm et al. | 381/94 |
| 5,579,396 A | 11/1996 | Iida et al. | 381/18 |
| 5,581,618 A | 12/1996 | Satoshi et al. | 381/17 |
| 5,594,800 A * | 1/1997 | Gerzon | 381/20 |
| 5,710,818 A | 1/1998 | Yamato et al. | 381/1 |
| 5,727,066 A | 3/1998 | Elliott et al. | |
| 5,742,689 A | 4/1998 | Tucker et al. | 381/17 |
| 5,754,663 A | 5/1998 | Goldfarb | 381/82 |
| 5,757,927 A * | 5/1998 | Gerzon et al. | 381/20 |
| 5,761,315 A | 6/1998 | Iida et al. | 381/18 |
| 5,768,124 A * | 6/1998 | Stothers et al. | 700/38 |
| 5,822,438 A | 10/1998 | Sekine et al. | 381/17 |
| 5,848,163 A | 12/1998 | Gopalakrishnan et al. | 381/56 |
| 5,862,227 A | 1/1999 | Orduna-Bustamante et al. | |
| 6,052,470 A | 4/2000 | Mouri | 381/18 |
| 6,111,962 A | 8/2000 | Akio | 381/63 |
| 6,122,382 A | 9/2000 | Iida et al. | 381/18 |
| 6,243,322 B1 | 6/2001 | Zakarauskas | 367/127 |
| 6,366,679 B1 | 4/2002 | Steffen et al. | 381/356 |
| 6,385,320 B1 | 5/2002 | Lee | 381/17 |
| 6,522,756 B1 | 2/2003 | Maisano et al. | 381/92 |
| 6,549,630 B1 | 4/2003 | Bobisuthi | 381/94.7 |
| 6,584,203 B2 | 6/2003 | Elko et al. | 381/92 |
| 6,625,587 B1 | 9/2003 | Erten et al. | 706/22 |
| 6,674,865 B1 | 1/2004 | Venkatesh et al. | 381/107 |
| 6,691,073 B1 | 2/2004 | Erten et al. | 702/190 |
| 6,754,623 B2 | 6/2004 | Deligne et al. | 704/233 |
| 6,850,621 B2 | 2/2005 | Sotome et al. | 381/17 |
| 6,937,737 B2 | 8/2005 | Polk, Jr. | 381/300 |
| 6,947,570 B2 | 9/2005 | Maisano | 381/313 |
| 6,956,954 B1 | 10/2005 | Takemura et al. | 381/307 |
| 7,003,119 B1 | 2/2006 | Arthur | 381/17 |
| 7,020,291 B2 | 3/2006 | Buck et al. | 381/92 |
| 7,039,197 B1 | 5/2006 | Venkatesh et al. | 381/86 |
| 7,065,338 B2 * | 6/2006 | Mano et al. | 455/313 |
| 7,065,416 B2 | 6/2006 | Weare et al. | 700/94 |
| 7,076,068 B2 | 7/2006 | Sotome et al. | 381/17 |
| 7,082,201 B2 | 7/2006 | Sotome et al. | 381/17 |
| 7,095,455 B2 | 8/2006 | Jordan et al. | 348/734 |
| 7,095,865 B2 | 8/2006 | Katayama et al. | 381/309 |
| 7,099,480 B2 | 8/2006 | Willems | 381/18 |
| 7,113,609 B1 | 9/2006 | Neidich et al. | 381/305 |
| 7,113,610 B1 | 9/2006 | Chrysanthakopoulos | 381/309 |
| 7,123,731 B2 | 10/2006 | Cohen et al. | 381/303 |
| 7,167,566 B1 | 1/2007 | Bauck | 381/17 |
| 7,171,003 B1 | 1/2007 | Venkatesh et al. | 381/66 |
| 7,177,432 B2 | 2/2007 | Eid et al. | 381/22 |
| 7,206,413 B2 | 4/2007 | Eid et al. | 381/22 |
| 7,231,053 B2 | 6/2007 | Polk, Jr. | 381/300 |
| 7,242,782 B2 | 7/2007 | Kasai et al. | 381/97 |
| 7,266,501 B2 | 9/2007 | Saunders et al. | 704/500 |
| 7,330,557 B2 | 2/2008 | Fischer et al. | 381/313 |
| 7,415,117 B2 * | 8/2008 | Tashev et al. | 381/92 |
| 7,567,845 B1 | 7/2009 | Avendano et al. | |
| 7,660,424 B2 * | 2/2010 | Davis | 381/20 |
| 7,853,022 B2 * | 12/2010 | Thompson et al. | 381/17 |
| 7,881,480 B2 | 2/2011 | Buck et al. | 381/94.1 |
| 7,929,708 B2 * | 4/2011 | Reams et al. | 381/17 |
| 8,103,006 B2 * | 1/2012 | McGrath | 381/20 |
| 8,103,066 B2 | 1/2012 | Kim et al. | |
| 2001/0036286 A1 | 11/2001 | Layton et al. | 381/304 |
| 2002/0037083 A1 | 3/2002 | Weare et al. | 381/58 |
| 2002/0037084 A1 | 3/2002 | Kakuhari et al. | 381/98 |
| 2002/0039425 A1 | 4/2002 | Burnett et al. | 381/94.7 |
| 2002/0159607 A1 | 10/2002 | Ford et al. | 381/103 |
| 2003/0007648 A1 * | 1/2003 | Currell | 381/61 |
| 2003/0035553 A1 * | 2/2003 | Baumgarte et al. | 381/94.2 |
| 2003/0045953 A1 | 3/2003 | Weare | 700/94 |
| 2003/0061032 A1 | 3/2003 | Gonopolskiy | 704/200.1 |
| 2003/0072460 A1 | 4/2003 | Gonopolskiy et al. | 381/92 |
| 2003/0128848 A1 | 7/2003 | Burnett | 381/71.8 |
| 2003/0135377 A1 | 7/2003 | Kurianski et al. | 704/500 |
| 2003/0169887 A1 | 9/2003 | Fujita et al. | 381/63 |
| 2003/0174845 A1 | 9/2003 | Hagiwara | 381/17 |
| 2003/0223603 A1 | 12/2003 | Beckman | 381/310 |
| 2004/0066940 A1 | 4/2004 | Amir | 381/94.2 |
| 2004/0223620 A1 | 11/2004 | Horbach et al. | 381/59 |
| 2004/0228498 A1 | 11/2004 | Sekine | 381/303 |
| 2004/0240697 A1 | 12/2004 | Keele, Jr. | 381/336 |
| 2004/0258255 A1 | 12/2004 | Zhang et al. | 381/92 |
| 2005/0053249 A1 | 3/2005 | Wu et al. | 381/310 |
| 2005/0069143 A1 | 3/2005 | Budnikov et al. | 381/63 |
| 2005/0129249 A1 | 6/2005 | Chabanne | 381/17 |
| 2005/0195984 A1 | 9/2005 | Miura et al. | 381/63 |
| 2005/0195988 A1 | 9/2005 | Tashev et al. | |
| 2005/0220312 A1 | 10/2005 | Kasai et al. | 381/97 |
| 2005/0232440 A1 | 10/2005 | Roovers | 381/92 |
| 2005/0249356 A1 | 11/2005 | Holmi et al. | 381/86 |
| 2005/0281408 A1 | 12/2005 | Kim et al. | 381/17 |
| 2005/0286727 A1 | 12/2005 | Otsuka | 381/18 |
| 2006/0039567 A1 | 2/2006 | Huang | 381/22 |
| 2006/0045275 A1 | 3/2006 | Daniel | 381/17 |
| 2006/0045294 A1 | 3/2006 | Smyth | 381/309 |
| 2006/0062410 A1 | 3/2006 | Kim et al. | 381/310 |
| 2006/0072766 A1 | 4/2006 | Klein et al. | |
| 2006/0088175 A1 | 4/2006 | Eid et al. | 381/104 |
| 2006/0098830 A1 | 5/2006 | Roeder et al. | 381/310 |
| 2006/0109992 A1 | 5/2006 | Roeder et al. | 381/310 |
| 2006/0126878 A1 | 6/2006 | Takumai et al. | 381/335 |
| 2006/0171547 A1 | 8/2006 | Lokki et al. | 381/92 |
| 2006/0222182 A1 | 10/2006 | Nakaishi et al. | 381/27 |
| 2006/0222184 A1 | 10/2006 | Buck et al. | 381/71.1 |
| 2006/0233382 A1 | 10/2006 | Watanabe | 381/56 |
| 2006/0256978 A1 | 11/2006 | Balan et al. | 381/94.7 |
| 2006/0269071 A1 | 11/2006 | Nakano | 381/17 |
| 2006/0274902 A1 | 12/2006 | Hume et al. | 381/17 |
| 2006/0280311 A1 | 12/2006 | Beckinger et al. | 381/17 |
| 2006/0280323 A1 | 12/2006 | Neidich et al. | 381/300 |
| 2007/0014417 A1 | 1/2007 | Fujita et al. | 381/17 |
| 2007/0019816 A1 | 1/2007 | Konagai | 381/59 |
| 2007/0036366 A1 | 2/2007 | Konagai et al. | 381/61 |
| 2007/0047743 A1 | 3/2007 | Taenzer et al. | 381/92 |
| 2007/0064954 A1 | 3/2007 | Booth et al. | 381/58 |
| 2007/0110250 A1 * | 5/2007 | Bauck | 381/20 |
| 2007/0110268 A1 * | 5/2007 | Konagai et al. | 381/335 |
| 2007/0129952 A1 | 6/2007 | Kenyon et al. | 704/500 |
| 2007/0154020 A1 | 7/2007 | Katayama | 381/17 |
| 2007/0230725 A1 * | 10/2007 | Wang | 381/309 |
| 2007/0253574 A1 | 11/2007 | Soulodre | 381/94.2 |
| 2007/0269063 A1 | 11/2007 | Goodwin et al. | |
| 2008/0069366 A1 | 3/2008 | Soulodre | 381/63 |
| 2008/0232603 A1 * | 9/2008 | Soulodre | 381/63 |
| 2008/0232617 A1 * | 9/2008 | Goodwin et al. | 381/307 |
| 2008/0260175 A1 | 10/2008 | Elko | 381/73.1 |
| 2009/0060209 A1 * | 3/2009 | Takeishi | H04R 3/04 381/17 |
| 2009/0062945 A1 * | 3/2009 | Trautmann et al. | 700/94 |
| 2009/0144063 A1 * | 6/2009 | Beack et al. | 704/500 |
| 2009/0182564 A1 * | 7/2009 | Beack et al. | 704/500 |
| 2010/0098265 A1 * | 4/2010 | Pan et al. | 381/94.1 |

(56) References Cited

U.S. PATENT DOCUMENTS

| | | | |
|---|---|---|---|
| 2011/0081024 A1 | 4/2011 | Soulodre | 381/17 |
| 2012/0063608 A1 | 3/2012 | Soulodre | 381/66 |

FOREIGN PATENT DOCUMENTS

| | | | | |
|---|---|---|---|---|
| CN | 101518101 A | 8/2009 | | |
| CN | 101518102 A | 8/2009 | | |
| EP | 0 989 543 A2 | 3/2000 | | G10K 15/08 |
| EP | 1 465 159 A1 | 10/2004 | | G10L 21/02 |
| JP | 05-073082 | 3/1993 | | G10K 15/00 |
| JP | 2000013900 A | 1/2000 | | |
| JP | 2001267973 A | 9/2001 | | |
| JP | 2003-005770 | 1/2003 | | G10K 15/12 |
| JP | 2003523675 A | 8/2003 | | |
| JP | 2003-263178 | 9/2003 | | G10K 15/12 |
| JP | 2003-271165 | 9/2003 | | G10K 15/12 |
| JP | 2007201818 A | 8/2007 | | |
| JP | 2009171262 A | 7/2009 | | |
| KR | 10-2006-0043338 | 5/2006 | | |
| WO | WO 01/76319 A1 | 10/2001 | | H04R 3/00 |
| WO | WO 01/76319 A2 | 10/2001 | | H04R 3/00 |
| WO | 0237472 A2 | 10/2002 | | |
| WO | WO 03/053033 A1 | 6/2003 | | H04M 9/08 |
| WO | WO 2006/006809 A1 | 1/2006 | | |
| WO | WO 2006/068009 A1 | 1/2006 | | |
| WO | WO 2006/040734 A1 | 4/2006 | | H04B 3/23 |
| WO | 2008039339 A2 | 4/2008 | | |
| WO | 2008066364 A1 | 6/2008 | | |
| WO | 2008113428 A1 | 9/2008 | | |

OTHER PUBLICATIONS

Griesinger, David, "Practical Processors and Programs for Digital Reverberation," *Proceedings of the AES 7th International Conference, Audio Engineering Society*, Toronto, May 1989, pp. 187-195, (11 pgs.).

Griesinger, David, "Spaciousness and Envelopment in Musical Acoustics," *Presented at the 101st Convention of the Audio Engineering Society*, Los Angeles, Nov. 8-11, 1996, Preprint #4401, 13 pages.

Griesinger, David, "General Overivew of Spatial Impression, Envelopment, Localization, and Externalization," *Proceedings of the 15th International Conference of the Audio Engineering Society on Small Room Acoustics*, Denmark, Oct. 31-Nov. 2, 1998, pp. 136-149, (15 pgs.).

Griesinger, David, "Improving Room Acoustics Through Time Variant Synthetic Reverberation," *Presented at the 90th Convention of the Audio Engineering Society*, Paris, Feb. 1991, reprint #3014, 15 pgs.

Griesinger, David, "Room Impression Reverberance and Warmth in Rooms and Halls," *Presented at the 93rd Convention of the Audio Engineering Society*, San Francisco, Nov. 1992, Preprint #3383, 8 pages.

Griesinger, David, "Measures of Spatial Impression and Reverberance based on the Physiology of Human Hearing," Proceedings of the 11th International Audio Engineering Society Conference, May 1992, pp. 114-145, (33 pgs.).

Griesinger, David, "Multichannel Sound Systems and Their Interaction with the Room," *Presented at the 15th International Conference of the Audio Engineering Society*, Copenhagen, Oct. 1998, pp. 159-173, (16 pgs.).

Griesinger, David, "How Loud is My Reverberation?," *Presented at the 98th Convention of the Audio Engineering Society*, Paris, Feb. 1995, 7 pages.

Griesinger, David, "Spaciousness and Localization in Listening Rooms and Their Effects on the Recording Technique," *J. Audio Eng. Soc.*, vol. 34, No. 4, 1986, pp. 255-268, (16 pgs.).

Griesinger, David, "The Psychoacoustics of Apparent Source Width, Spaciousness, and Envelopment in Performance Spaces," *Acta Acoustics*, vol. 83, 1997, pp. 721-731, (11 pgs.).

Griesinger, David, "The Theory and Practice of Perceptual Modeling—How to Use Electronic Reverberation to Add Depth and Envelopment Without Reducing Clarity," material from David Griesinger's Internet Home Page, obtained from the Internet at: <www.world.std.com/~griesngr . . . >, undated but prior to May 2002, 28 pgs.

Griesinger, David, "Internet Home Page," obtained from the Internet at: <www.world.std.com/~griesnger/>, printed on Apr. 26, 2004, (9 pgs.).

Julia Jakka, "Binaural to Multichannel Audio Upmix", Helsinki University of Technology, Jun. 6, 2005.

Allen, J.B. et al., Multimicrophone Signal-Processing Technique to Remove Room Reverberation From Speech Signals, Oct. 1977, pp. 912-915, vol. 62, No. 4, Acoustical Society of America.

Tsoukalas, Dionysis E. et al., Speech Enhancement Based on Audible Noise Suppression, Nov. 1997, pp. 497-512, vol. 5, No. 6, IEEE.

Bradley, John S. et al., The Influence of Late Arriving Energy on Spatial Impression, Apr. 1995, pp. 2263-2271, Acoustical Society of America.

Widrow, Bernard et al., Adaptive Noise Cancelling: Principles and Applications, Dec. 1975, pp. 1692-1717, vol. 63, No. 12, IEEE.

Ramarapu, Pavan K. et al., Methods for Reducing Audible Artifacts in a Wavelet-Based Broad-Band Denoising System, Mar. 1998, pp. 178-190, vol. 46, No. 3, Audio Engineering Society.

Sambur, Marvin R., Adaptive Noise Canceling for Speech Signals, Oct. 1978, pp. 419-423, vol. ASSP-26, No. 5, IEEE.

Thiede, Thilo et al., PEAQ—The ITU Standard for Objective Measurement of Perceived Audio Quality, Jan./Feb. 2000, pp. 3-29, vol. 48, No. ½, Audio Engineering Society.

Johnston, James D., Transform Coding of Audio Signals Using Perceptual Noise Criteria, Feb. 1998, pp. 314-323, vol. 6, No. 2, IEEE.

Todd, Craig C. et al., AC-3: Flexible Perceptual Coding for Audio Transmission and Storage, $96^{th}$ Convention Feb. 26-Mar. 1, 1994, pp. 1-17, AES.

Levine, Scott N., A Switched Parametric and Transform Audio Coder, 1999, pp. 1-4, ICASSP, Phoenix, Arizona.

F. J. Harris, "On the Use of Windows for Harmonic Analysis with the Discrete Fourier Transform," Proc/. IEEE, vol. 6, No. 1, Jan. 1978, pp. 51-83.

Eargle, John. The Microphone Book. Focal Press, 2004. pp. 50-90.

Wu et al. "A One-Microphone Approach for Reverberant Speech Enhancement", 2003 IEEE International Conference on Acoustics, Speech and Signal Processing, pp. I-844 to I-847, Apr. 6-10, 2003, Hong Kong.

Baskind et al. "Pitch-Tracking of Reverberant Sounds, Application to Spatial Description of Sound Scenes", AES $24^{th}$ International Conference—Multichannel Audio: The New Reality, Jun. 26-28, 2003, Banff, Alberta, Canada.

Theile, Gunther "Wave Field Synthesis—a Promising Spatial Audio Rendering Concept", Proc. F the $7^{th}$ Int. Conference on Digital Audio Effects, Oct. 5-8, 2004, pp. 125-132.

International Search Report and Written Opinion, PCT/US2010/051372, Jan. 20, 2011, 4 pgs.

Miyoshi, Masato et al., Inverse Filtering of Room Acoustics, Feb. 1988, vol. 36, No. 2, pp. 145-152, IEEE.

Borrallo et al., On the Implementation of a Partitioned Block Frequency Domain Adaptive Filter (PBFDAF) for Long Acoustic Echo Cancellation, vol. 27, No. 3, Jun. 1, 1992, pp. 301-315, Elsevier Science Publishers B.V.

Olswang, Benjamin et al., Separation of Audio Signals into Direct and Diffuse Soundfields for Surround Sound, May 2006, ICASSP 2006, pp. 357-360. IEEE.

Canadian Patent Office, Jan. 21, 2014 Office Action, Application No. 2,774,415, 3 pages.

Chinese Patent Office, Feb. 26, 2014 Office Action, Application No. 2007835631, 13 pages (English Abstract one page).

Japanese Patent Office, Aug. 22, 2013 Office Action, Application No. 2012532145, 3 pages.

Korean Patent Office, Apr. 18, 2013 Office Action, Application No. 10-2012-7008795, 6 pages (English Abstract 6 pages).

(56) References Cited

OTHER PUBLICATIONS

Second Report on Examination for Canadian Application No. 2,774,415, mailed by the Canadian Patent Office on Mar. 16, 2015, 4 pages.
Second Office Action for CN201080044783.3, mailed by the Chinese Patent Office on Nov. 5, 2014, 11 pages.
First Report on Examination for EP 10 779 078.4, mailed by the European Patent Office on Mar. 11, 2015, 5 pages.
Office Action for CN 201080044783.3, mailed by the Chinese Patent Office on Mar. 2, 2015, 19 pages.
Examiner's Report dated Mar. 3, 2016 from corresponding Canadian patent application No. 2774415 (3 pages).

* cited by examiner

SYSTEM FOR SPATIAL EXTRACTION OF AUDIO SIGNALS

PRIORITY CLAIM

This application claims the benefit of priority from U.S. Provisional Application No. 61/248,770, filed Oct. 5, 2009, which is incorporated by reference.

BACKGROUND OF THE INVENTION

1. Technical Field

The invention relates generally to audio systems, and more particularly to a system for spatially extracting the contents of an audio signal.

2. Related Art

Generating audible sound from an audio signal with a sound system is well known. The audio signal may be a pre-recorded audio signal or a live audio signal. Upon receiving the audio signal, the sound system may process the audio signal and typically provides an amplified form of the audio signal to a loudspeaker to generate audible sound. An example of a live audio signal would be a live stage performance with a singer and a band, such as an orchestra. An example of a pre-recorded audio signal would be a compact disc or electronic datafile on which a song of the singer and the band had been stored. Any other audio source may also be similarly provided.

Typically, compact disks, electronic datafiles and other forms of audio signal storage are made from a master recording of a source of audio, such as the singer and band performing in a studio or live concert venue. The singer and the band may perform using microphones, amplifiers, and recording equipment to receive and capture the live music being created by the singer and the band. During the recording, a sound mixing engineer may strategically position any number of microphones among the members of the band in order to receive the desired live sounds for recording. The recording equipment includes any number of input channels, configured to receive live audio inputs from the microphones and other instruments being played by the band.

The sound mixing engineer then mixes or adjusts the channels on which the audio signals were received to obtain a desired overall sound by the singer and the band. In addition, the sound mixing engineer may re-mix or otherwise adjust the recorded audio so as to designate how the recording will play back at a later time. For example, the sound mixing engineer may adjust the individual audio signals to make the position of the singer be perceived by listeners to be in a central location when the recording is played through the loudspeakers of an audio system, a violin be perceived as to the left side of the singer, and a guitar be perceived as to the right side of the singer.

Audio systems may also receive a two or more channel audio input signal, such as a stereo signal, and develop more output channels than the received input channels. Such audio systems include a system manufactured by Harman International Industries, Incorporated of Northridge Calif. that is known as "Logic 7™." Such systems distribute the audio input signal to the output channels based on analysis of the phasing of the audio input signals with respect to each other.

SUMMARY

A sound processing system may receive an audio input signal that includes at least two separate audio channels. The audio input signal may be analyzed to determine perceptual locations of sources of audible sound, or audio sources, included in the audio input signal. The perceptual locations may be identified based on a listener perceived sound stage. The listener perceived sound stage may be conceptually based on playback of the audio input signal through a stereo audio system, or a surround sound audio system, or any other form of audio playback system capable of outputting audible sound to create a listener perceived sound stage based on an audio input signal.

The sound processing system may divide the listener perceived sound stage into any predetermined number of perceptual locations, which may also be referred to as spatial slices, of the listener perceived sound stage. For example, where the audio input signal is a stereo input signal, the number of perceptual locations may be equal to a desired number of output audio channels, such as seven audio output channels representing a left front output channel, a right front output channel, a center output channel, a right side output channel, a left side output channel, a right rear output channel, and a left rear output channel. In addition, the audio input signal may be divided into a plurality of predetermined bands of frequency and the perceptual locations of sources of audible sound may be identified within the predetermined bands of frequency.

To separate the audio input signal into the spatial slices, the sound processing system may determine and generate a gain vector for each of the spatial slices. Each of the gain vectors include gain values that cover a predetermined band of frequency within the total frequency range of the audio input signal. The gain values may be generated based on the content of the audio input signal so that sources of audible sound included in the audio input signal are separated into the spatial slices according to the location of the sources of audible sound in the listener perceived sound stage. The gain vectors may be formed with a plurality of location filters forming a locational filter bank. In one example, the number of location filters in the locational filter bank may correspond to the number of spatial slices and the number of desired audio output channels.

The locational filter bank may be applied to the audio input signal to divide the audio input signal into separate and independent sound source vectors such that each spatial slice may include a corresponding sound source vector. Each sound source vector may include a portion of the audio input signal representative of one or more sources of audible sound that are included in the spatial slice of the listener perceived sound stage.

The sound source vectors may be independently processed by the audio processing system. Processing may include classification of the sources of audible sound included in each of the sound source vectors. For example, classification may include identifying the source of audible sound represented in a first sound source vector in a first spatial slice as a musical instrument, such as a trumpet, and identification of the source of audible sound included in a second sound source vector in a second spatial slice as a human voice. Processing may also include equalization, delay, or any other sound processing techniques.

Following processing, the sound source vectors may be assembled to form an audio output signal containing multiple audio output channels from which loudspeakers may be driven. Assembly may include combining the sound source vectors, dividing the sound source vectors, simply passing the sound source vectors through as audio output channels, or any other form of collaborative use of the sound source vectors to generate an audio output signal containing multiple audio output channels.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
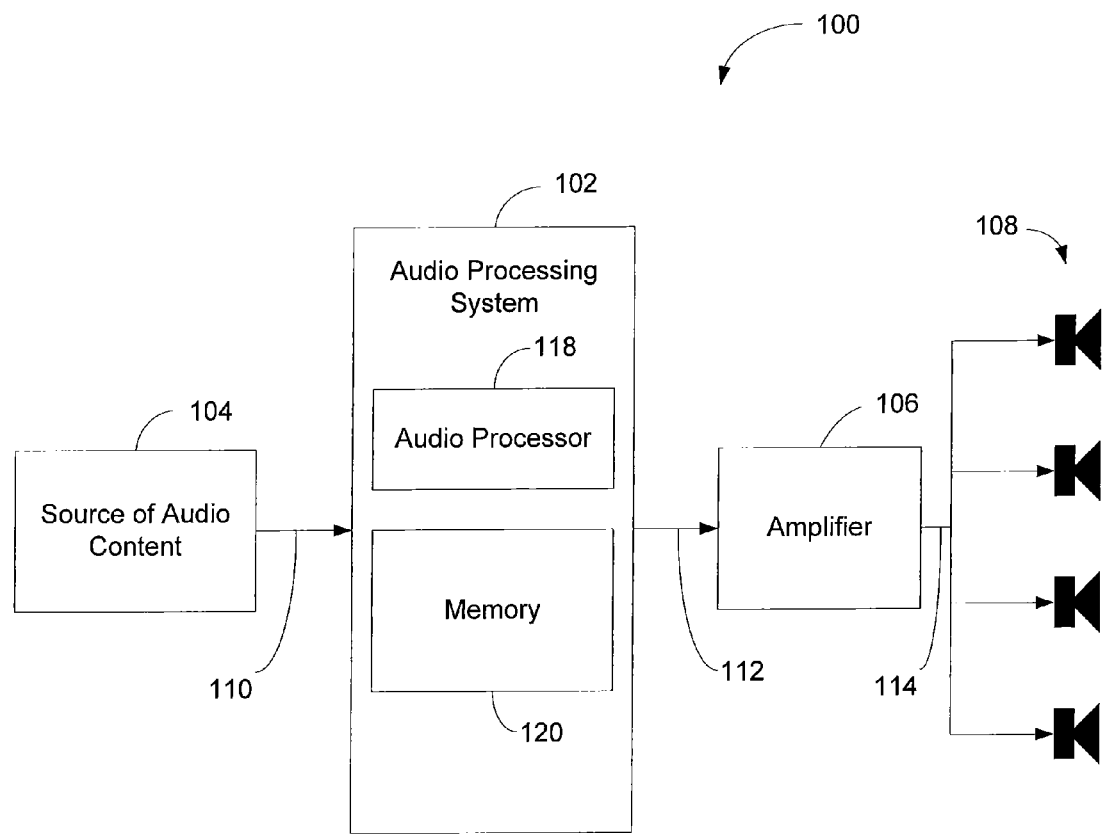
FIG. 1 is a block diagram of an example audio system that includes an audio processing system.

FIG. 1 is an example audio system 100 that includes an audio processing system 102. The audio system 100 may also include at least one source of audio content 104, at least one amplifier 106 and a plurality of loudspeakers 108. The audio system 100 may be any system capable of producing audible audio content. Example audio systems 100 include a vehicle audio system, a stationary consumer audio system such as a home theater system, an audio system for a multimedia system such as a movie theater or television, a multi-room audio system, a public address system such as in a stadium or convention center, an outdoor audio system, or any other venue in which it is desired to reproduce audible audio sound.

The source of audio content 104 may be any form of one or more devices capable of generating and outputting different audio signals on at least two channels. Examples of the source of audio content 104 include a media player, such as a compact disc, or video disc player, a video system, a radio, a cassette tape player, a wireless or wireline communication device, a navigation system, a personal computer, a codec such as an MP3 player or an IPOD™ or any other form of audio related device capable of outputting different audio signals on at least two channels.

In FIG. 1, the source of audio content 104 produces two or more audio signals on respective audio input channels 110 from source material such as pre-recorded audible sound. The audio signals may be audio input signals produced by the source of audio content 104, and may be analog signals based on analog source material, or may be digital signals based on digital source material. Accordingly, the source of audio content 104 may include signal conversion capability such as analog-to-digital or digital-to-analog converters. In one example, the source of audio content 104 may produce stereo audio signals consisting of two substantially different audio signals representative of a right and a left channel provided on two audio input channels 110. In another example, the source of audio content 104 may produce greater than two audio signals on greater than two audio input channels 110, such as 5.1 surround, 6.1 surround, 7.1 surround or any other number of different audio signals produced on a respective same number of audio input channels 110.

The amplifier 106 may be any circuit or standalone device that receives audio input signals of relatively small magnitude, and outputs similar audio signals of relatively larger magnitude. Two or more audio input signals may be received on two or more amplifier input channels 112 and output on two or more audio output channels 114. In addition to amplification of the amplitude of the audio signals, the amplifier 106 may also include signal processing capability to shift phase, adjust frequency equalization, adjust delay or perform any other form of manipulation or adjustment of the audio signals. Also, the amplifier 106 may include capability to adjust volume, balance and/or fade of the audio signals provided on the audio output channels 114. In an alternative example, the amplifier may be omitted, such as when the loudspeakers 108 are in the form of a set of headphones, or when the audio output channels serve as the inputs to another audio device. In still other examples, the loudspeakers 108 may include the amplifier, such as when the loudspeakers 108 are self-powered loudspeakers.

The loudspeakers 108 may be positioned in a listening space such as a room, a vehicle, or in any other space where the loudspeakers 108 can be operated. The loudspeakers 108 may be any size and may operate over any range of frequency. Each audio output channel 114 may supply a signal to drive one or more loudspeakers 108. Each of the loudspeakers 108 may include a single transducer, or multiple transducers. The loudspeakers 108 may also be operated in different frequency ranges such as a subwoofer, a woofer, a midrange and a tweeter. Two or more loudspeakers 108 may be included in the audio system 100.

The audio processing system 102 may receive the audio input signals from the source of audio content 104 on the audio input channels 110. Following processing, the audio processing system 102 provides processed audio signals on the amplifier input channels 112. The audio processing system 102 may be a separate unit or may be combined with the source of audio content 104, the amplifier 106 and/or the loudspeakers 108. Also, in other examples, the audio processing system 102 may communicate over a network or communication bus to interface with the source of audio content 104, the audio amplifier 106, the loudspeakers 108 and/or any other device or mechanism (including other audio processing systems 102).

One or more audio processors 118 may be included in the audio processing system 102. The audio processors 118 may be one or more computing devices capable of processing audio and/or video signals, such as a computer processor, microprocessor, a digital signal processor, or any other device, series of devices or other mechanisms capable of performing logical operations. The audio processors 118 may operate in association with a memory 120 to execute instructions stored in the memory. The instructions may be in the form of software, firmware, computer code, or some combination thereof, and when executed by the audio processors 118 may provide the functionality of the audio processing system 102. The memory 120 may be any form of one or more data storage devices, such as volatile memory, non-volatile memory, electronic memory, magnetic memory, optical memory, or any other form of data storage device. In addition to instructions, operational parameters and data may also be stored in the memory 120. The audio processing system 102 may also include electronic devices, electro-mechanical devices, or mechanical devices such as devices for conversion between analog and digital signals, filters, a user interface, a communications port, and/or any other functionality to operate and be accessible to a user and/or programmer within the audio system 100.

During operation, the audio processing system 102 receives and processes the audio input signals. In general, during processing of the audio input signals, the audio processor 118 identifies a plurality of perceptual locations of each of a plurality of sources of audible sound represented within an audio input signal. The perceptual locations are representative of physical locations of the respective sources of audible sound within a listener perceived sound stage. Accordingly, if a listener were present at a live performance occurring on an actual stage, the perceptual locations would align with the locations on the stage of the performers, such as guitarists, drummers, singers and any other performers or objects producing sound within the audio signals.

The audio processor 118 decomposes the audio input signals into a set of spatial audio streams, or spatial slices, each containing audio content from a respective one (at least) of the perceptual locations. Any sound sources that are co-located within a given perceived location may be included in the same spatial audio stream. Any number of different spatial audio streams may be created across the listener perceived soundstage. The spatial audio streams may be independently processed with the audio processor 118.

During operation, the audio processor 118 may generate a plurality of filters for each of a plurality of respective output channels based on the identified perceptual locations of the respective sources of audible sound. The audio processor 118 may apply the filters to the audio input signal to generate the spatial audio streams. The spatial audio streams may be independently processed. Following processing, the spatial audio streams may be assembled or otherwise recombined to generate an audio output signal having a plurality of respective audio output channels. The audio output channels are provided on the amplifier input lines 112. The audio processing system 102 may provide more or fewer audio output channels than the number of input channels included in the audio input signal. Alternatively, the audio processing system 102 may provide the same number of audio output channels as are provided as input channels.

Figure 2:
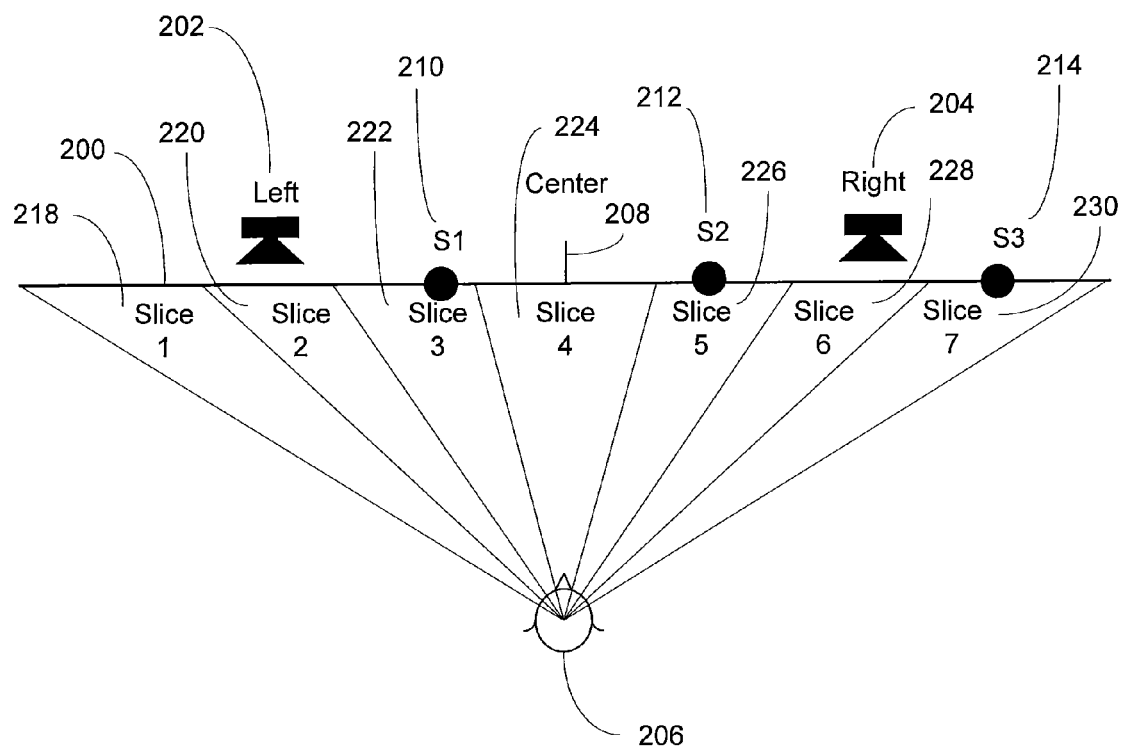
FIG. 2 is an example of a listener perceived sound stage.

FIG. 2 is an example illustrating perception across a listener perceived sound stage 200 formed with a stereo system configuration for receiving an audio input signal, such as a stereo audio input signal. In FIG. 2 a left loudspeaker 202 and a right loudspeaker 204 are driven by respective left and right channels of a source of audio content to produce sound that is received by a listener at a listening position 206. In other examples, additional channels and respective loudspeakers, loudspeaker locations, and additional/different sized listening positions may be illustrated.

In FIG. 2, the listening position 206 is located at a central location 208 that is substantially between the loudspeakers 202 and 204 such that the distance to each loudspeaker 202 and 204 is substantially the same. In this example, three factors may combine to allow the listener to determine a perceived location of any number of sound sources within the listener perceived sound stage 200 based on audible sound emitted from the loudspeakers 202 and 204. The factors include the relative amplitude level of a sound source in the left and right channels, the relative delay (time of arrival) of the sound source in the left and right channels, and the relative phase of the sound source in the left and right channels.

If the level of a sound source is perceived at the listener position 206 to be louder in the left channel (left loudspeaker 202), then the sound source will tend to be perceived by the listener to be located at a first perceptual location (S1) 210 in the listener perceived soundstage 200 that is closer to the left loudspeaker 202. Similarly, if the sound source arrives first at the listener position 206 from the right loudspeaker 204, then the sound source will tend to be perceived to be located in the listener perceived soundstage 200 at a second perceptual location (S2) 212 that is closer to the right loudspeaker 204. Thus, depending on the loudness and time of arrival, different sound sources may be perceived by a listener as being at different perceptual locations in the listener perceived soundstage 200. Also, if loudspeakers 202 and 204 are driven by audio signals having a significant phase shift between them, then it is possible for a sound source to be perceived to be located at a third perceptual location (S3) 214 that is beyond the right loudspeaker 204. FIG. 2 is a simple illustration of some example locations of sound sources within a listener perceived soundstage 200 in other examples, any number of sound sources located at any number of perceptual locations may be presented.

In FIG. 2, the listener perceived soundstage 200 has been divided into seven zones, which are also referred to as spatial slices or perceptual locations 218, 220, 222, 224, 226, 228, and 230. In other examples, the listener perceived soundstage 200 may be divided into any other number of perceptual locations. In FIG. 2, the first perceptual location (S1) 210 is estimated by the audio processor 118 to be positioned in a third spatial slice 222, the second perceptual location (S2) 212 is estimated to be positioned in a fifth perceptual slice 226, and the central location 208 is positioned in a fourth spatial slice 224.

Figure 3:
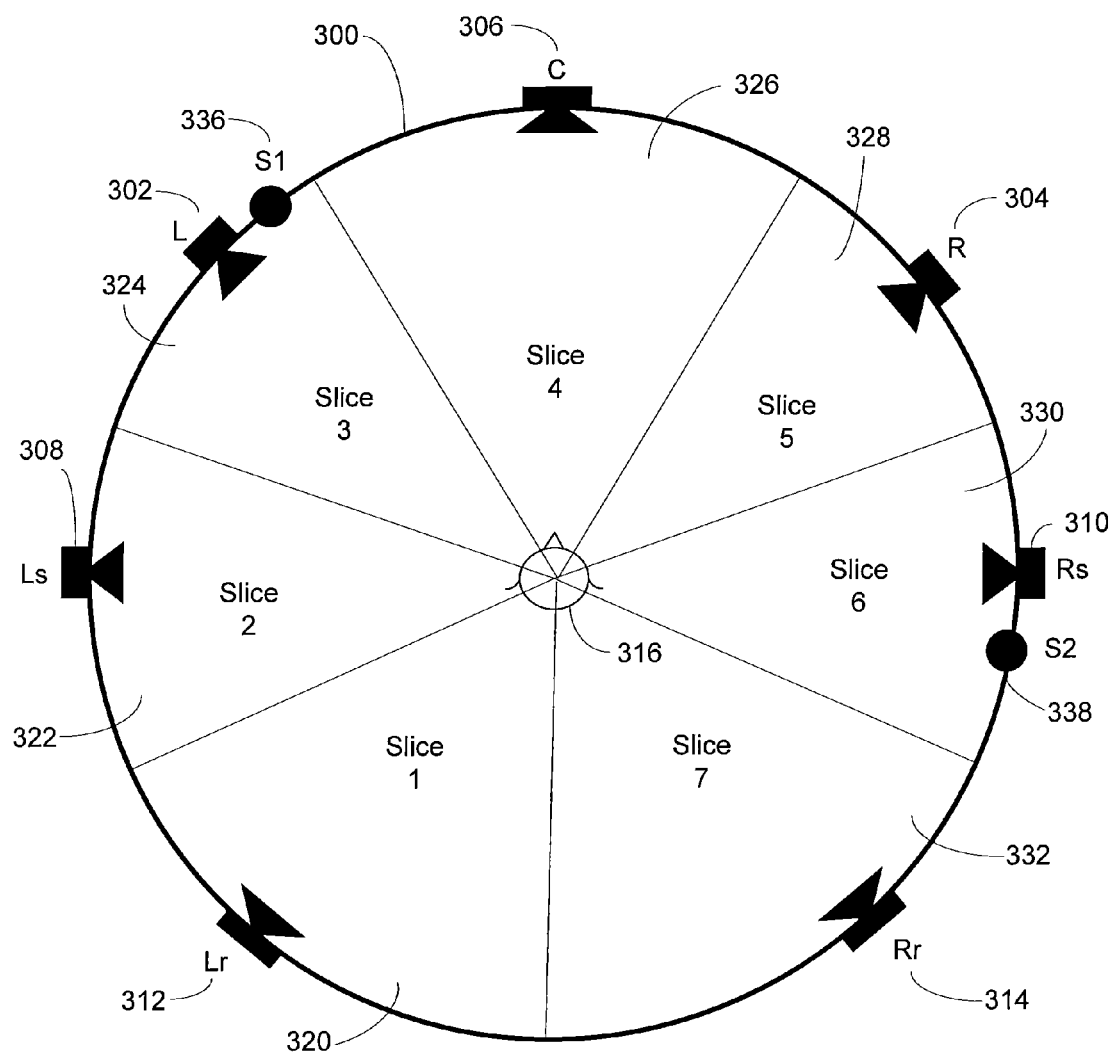
FIG. 3 is another example of a listener perceived sound stage.

FIG. 3 is another example of a listener perceived sound stage 300 that has been decomposed into spatial slices. The sound stage 300 has been formed with a surround sound system configuration for receiving a multi-channel audio signal such as 5.1, 6.1, 7.1, or some other surround sound audio signal. In FIG. 3, a left speaker 302, a right speaker 304, a center speaker 316, a left side speaker 308, a right side speaker 310, a left rear speaker 312, and a right rear speaker 314 are positioned away from a listening position 316. The listening position 316 is located at a substantially concentric location due to the circular position of the loudspeakers 302, 304, 306, 308, 310, 312, and 314. In other examples, any other number of loudspeakers and/or loudspeaker positions as well as listener positions may be illustrated.

In FIG. 3, seven spatial slices or perceptual locations 320, 322, 324, 326, 328, 330 and 332 that correspond to each of the respective loudspeakers 302, 304, 306, 308, 310, 312, and 314 surround the listener location 316. In other examples, any number of spatial slices may be used. In addition, the width of each spatial slice may be different in different examples. For example, the spatial slices may overlap or be spaced apart within the listener perceived sound stage 300.

The audio processor 118 may estimate a first perceived sound source (S1) 336 within the listener perceived sound stage 300 to be located within a third spatial slice 324, and a second perceived sound source (S2) 338 may be estimated to be located within a sixth spatial slice 330. In other examples, any number of perceived sound sources may be located within the spatial slices 320, 322, 324, 326, 328, 330 and 332.

Estimation of the location of a sound source within a listener perceived sound stage 300 may be based on comparison of the relative amplitudes, phases, and times of arrival of the channels of the audio input signal. In the example of a stereo audio input signal consisting of a right channel (R) and a left channel (L), calculation of the estimated location by the audio processor is based on:

$$S(\omega) = B\left(\frac{|L(\omega)V_L(\omega) - R(\omega)V_R(\omega)|^2}{|L(\omega)|^2 + |R(\omega)|^2}\right) \quad \text{(Equation 1)}$$

where $S(\omega)$ is the estimated location in a respective listener perceived sound stage 300, $L(\omega)$ is the complex representation (consisting of real and imaginary components) of the left audio input signal in the frequency domain, $R(\omega)$ is the complex representation (consisting of real and imaginary components) of the right audio input signal in the frequency domain, and B is a balance function. $V_L(\omega)$ and $V_R(\omega)$ are separate complex vectors (consisting of real and imaginary components) each having magnitudes equal to unity. $V_L(\omega)$ and $V_R(\omega)$ may be used to apply frequency dependent delays to $L(\omega)$ and $R(\omega)$. The values of the delays, and thus the values of $V_L(\omega)$ and $V_R(\omega)$ may be chosen to offset any difference that may exist in the time of arrival of a given sound source at the left (L) and right (R) input channels. Therefore $V_L(\omega)$ and $V_R(\omega)$ may be used to time-align a given sound source at the two input channels. It will be appreciated that the delays provided by $V_L(\omega)$ and $V_R(\omega)$ may alternatively be achieved in the time domain prior to converting the left and right audio inputs signals to the frequency domain. The variable $\omega$ indicates frequency or a range of frequencies. The balance function may by used to identify whether the sound source in the listener perceived soundstage is to the left of the center of the listener perceived sound stage, or to the right of the center of the listener perceived soundstage. The balance function (B) may be represented by:

$$B = A(|L(\omega)|^2 - |R(\omega)|^2) \quad \text{(Equation 2)}$$

where A is representative of an amplitude comparison by the audio processor 118 of the magnitude of the left audio input signal (L) to the magnitude of the right audio input signal (R). In one example, A can be set equal to one by the audio processor 118 when the amplitude of the left audio input signal is larger than the amplitude of the right audio input signal, A can be set equal to zero when the amplitude of the left audio input signal is equal to the amplitude of the right audio input signal, and A can be set equal to negative one when the amplitude of the left audio input signal is less than the amplitude of the right audio input signal.

Where there are multiple input channels, such as a five or seven input channel surround audio source, an alternative equation may be used in place of Equations 1 and 2 to account for multiple input channels:

$$S(\omega) = \frac{2}{\pi} \cdot \text{angle}\left(\sum_{k=1}^{C} M_k(\omega) V_k(\omega)\right) \quad \text{(Equation 3)}$$

where $S(\omega)$ is the estimated location in a respective listener perceived sound stage 300, $M_k(\omega)$ is the complex representation (consisting of real and imaginary components) of the $k^{th}$ audio input signal in the frequency domain, $V_k(\omega)$ is a complex directional vector (consisting of real and imaginary components). C is an integer greater than one and represents the number of input channels, and therefore in the example of a five input channel surround audio source, C=5. The values of the directional vectors $V_k(\omega)$ may be chosen to represent the angles of the speaker locations as intended for the multichannel input signal. For example, in the case of a multichannel input signal having five input channels, it is reasonable to assume that the input signal was created for a typical playback configuration consisting of a Center speaker located in front at 0 degrees, Left and Right speakers at +/−30 degrees, and Left and Right rear Surround speakers at +/−110 degrees. For this example configuration, a reasonable choice for the directional vectors may consist of $V_{Center}(\omega)=1+0i$, $V_{Left}(\omega)=0.866+0.5i$, $V_{Right}(\omega)=0.866-0.5i$, $V_{LeftSurround}(\omega)=-0.342+0.940i$, and $V_{RightSurround}(\omega)=-0.342-0.940i$, where i is the complex operator equal to the square-root of minus one. Equation 3 may be used to sum the contributions to the composite sound field from each of the input signal channels in order to derive a composite signal vector. This composite signal vector is complex valued (consisting of real and imaginary components). The angle function in Equation 3 may be used to compute the angle of the composite signal vector resulting from the summation process. In computing the angle in this example, the Center channel speaker corresponds to zero degrees. In other examples, zero degrees may be located elsewhere. The factor $2/\pi$ scales the value of $S(\omega)$ so that it falls in the range between +2 and −2. Equation 3 may be used for input signals having two or more channels.

Alternatively, in another example, the multiple input channels may be broken into pairs for application to Equations 1 and 2 such that a number of separate perceptual sound stages are created. For example, a perceptual sound stage may be created between the left front and right front, the left front and left side, the left side and left rear, and so on. In another example, an audio source of more than two input channels may be downmixed to a two input channel audio source, such as downmixing a five or seven input channel surround audio source to two input channel stereo audio source. Following extraction and processing, the audio source may be upmixed back to two or more audio output channels.

Figure 4:
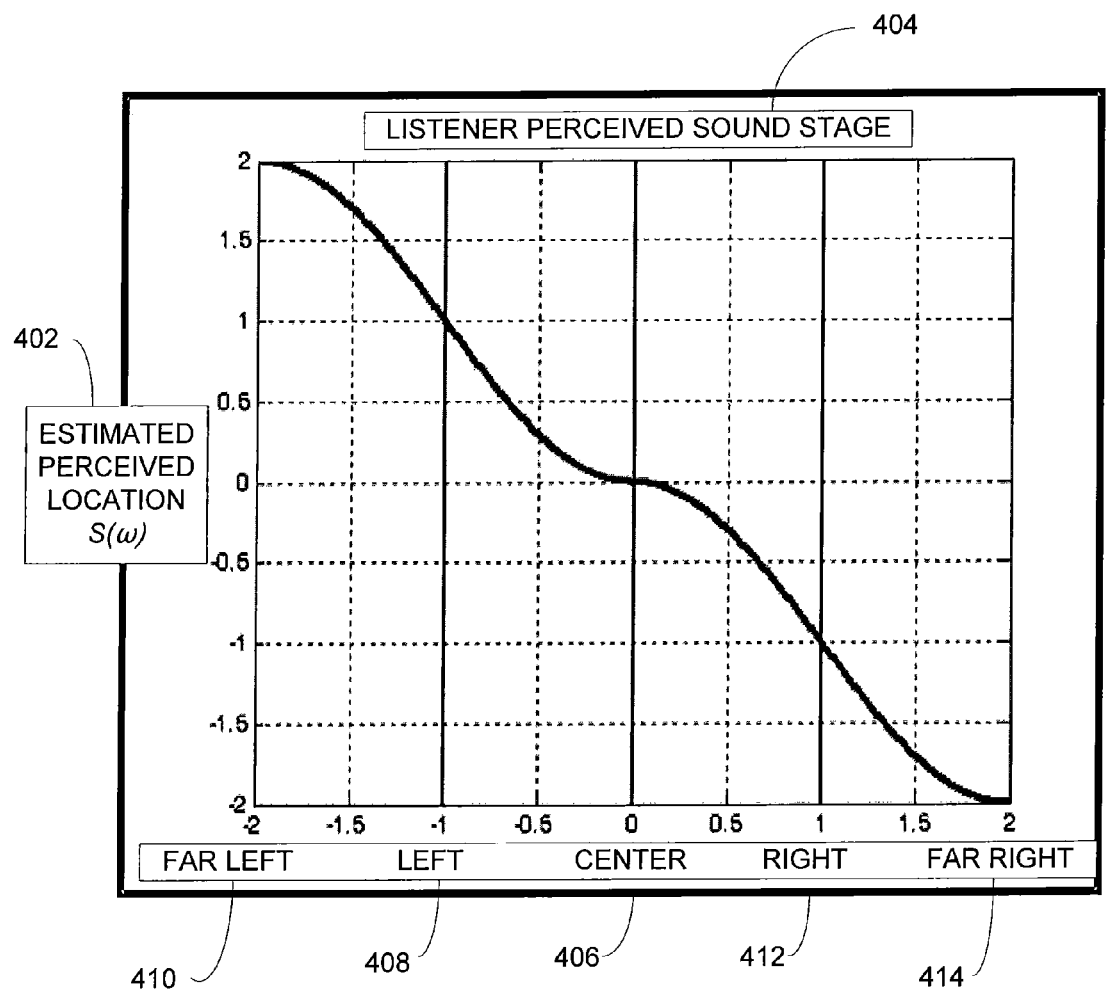
FIG. 4 is a graph representing an example relation between an estimated perceptual location and a listener perceived sound stage.

FIG. 4 is an example graph illustrating the relation between the calculated estimated location $S(\omega)$ 402 with respect to a listener perceived sound stage 404, such as the listener perceived sound stage 200 of FIG. 2. The listener perceived sound stage may be divided into a plurality of predetermined zones, each having location values from among a determined range of location values. In FIG. 4, the location values of the sound stage 404 are in a predetermined range of location values from −2 to +2, and includes a center location 406 at a central location of the listener perceived sound stage 404 identified as location zero zone, a left side location 408 identified as location negative one zone, a far left side location 410 identified as a negative two location zone, a right side location 412 identified as a positive one location zone, and a far right side location 414 identified as a positive two location zone. In other examples, other listener perceived sound stages, such as the listener perceived sound stage illustrated in FIG. 3, may be illustrated. In addition, other ranges of location values may be used to identify the different zones across the listener perceived sound stage, and additional or fewer zones may be present.

In FIG. 4, the estimated perceptual location $S(\omega)$ 402 is calculated to be between negative two and positive two in order to correspond with locations in the listener perceived sound stage 404. In other examples, other values may be used to represent the estimated perceptual location S(ω) 402. The value of the estimated perceptual location S(ω) 402 is calculated in accordance with Equation 1 to be either positive, negative, or zero based on the amplitude comparison A. (Equation 2).

Operation and signal processing within the audio system may occur in the frequency domain, or in the time domain based on analysis of the audio input signal. For purposes of brevity, the present discussion will be mainly focus on a frequency domain based implementation, however, time based implementations, or a combination time based and frequency based implementations are possible and within the scope of the system.

The audio input signal may be converted to a frequency domain representation by applying an overlapping window analysis to a block of time samples and converting the samples with Discrete Fourier Transform (DFT), wavelet transform, or other transformation process. Each block of time samples may be referred to as an instant in time, or a snapshot of the audio input signal. An instant in time, or snapshot may be any predetermined period of time, or window of time. Thus, the audio input signal may be divided into snapshots, or a sequence of contiguous or non-contiguous segments, where each segment has a start time, and an end time that form a predetermined amount of time between the start time and the end time. The end time of one segment of the audio input signal may adjacent to the start time of a subsequent segment of the audio input signal such that the segments are formed in an end-to-end configuration. In one example, each of the segments may represent a window of time, or snapshot having a duration of about 10 milliseconds. Typically, snapshots will have a duration of between about 5 and about 50 milliseconds. In the frequency domain, each snapshot of the audio input signal may be separated into a plurality of frequency bins across a predetermined frequency spectrum. The frequency bins may each be a predetermined size, such as about 50 Hz each, to encompass a predetermined frequency range, such as the audible frequency range of 0 Hz to 24 kHz. For example, based on a predetermined sample rate, such as 48 kHz, and a predetermined number of bins, such as 1024 bins, each of the bins may have a bandwidth of 46.875 Hz. In another example, the size of the bins may be dynamically and automatically varied by the audio processing system based on the sample rate of the audio input signal. For example, if the audio input signal is a digital signal that could be sampled at a sample rate of any of 44.1 kHz, 48 kHz, 88.2 kHz, or 96 kHz, the sample rate of the audio input signal could be sensed by the audio processing system, and the size of the frequency bins could be correspondingly adjusted such that the audio processing system ran at the sample rate of the audio input signal.

In one example, there may be 1024 frequency bins over the audible frequency range of 0 Hz to 24 kHz. Alternatively, the snapshot of the audio input signal may be divided into bands of frequency in the time domain using a bank of paralleled band-pass filters. The audio input signal may also be divided into a predetermined number of perceptual locations or spatial slices across the listener perceived sound stage based on Equations 1 and 2. Within each of the perceptual locations, the divided out portion of the audio input signal may be represented.

Figure 5:
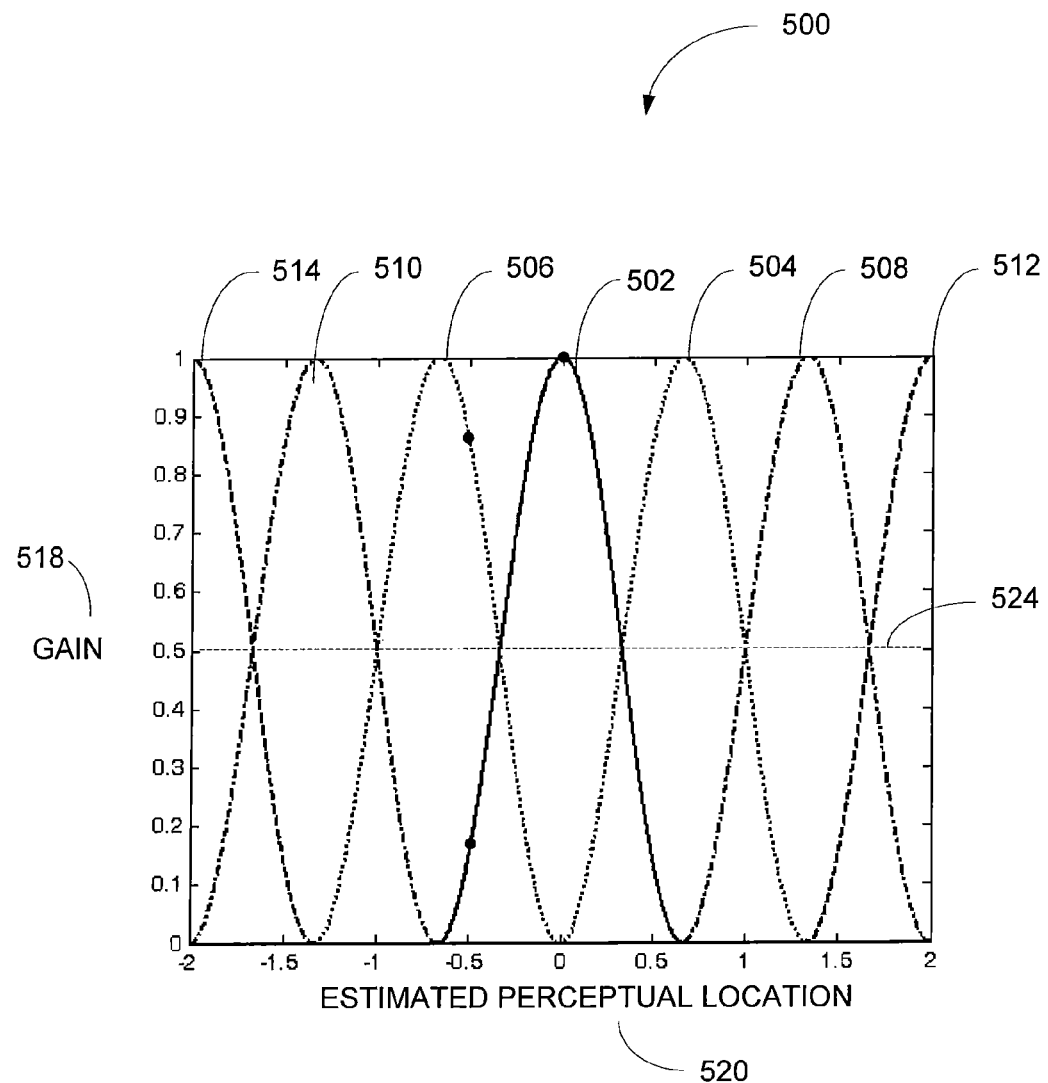
FIG. 5 is an example of a locational filter bank.

FIG. 5 represents an example locational filter bank 500 generated by the audio processing system 102 based on a listener perceived sound stage and Equations 1 and 2. In FIG. 5, representations of seven location filters are illustrated. The location filters may coincide with a number of output channels that are provided as audio output channels included in the audio output signal to drive loudspeakers. Alternatively, any number of filters may be used to generate a corresponding number of output channels for further processing or use prior to being used to form audio output channels to drive loudspeakers. Accordingly, any number of location filters may be used, and the output channels of the locational filters may be further processed, and then combined or divided to coincide with the number of audio output channels used to drive loudspeakers. For example, if a source of audible sound present in the audio input signal is not at a location in the listener perceived sound stage that corresponds to an audio output channel, two signals may be created for the audio output channels on either side of the location. In another example, where a source of audible sound present in the audio input signal is at a location in the listener perceived sound stage that corresponds to two or more audio output channels, the signals may be duplicated on the two or more audio output channels.

In FIG. 5, the location filters may include output channels corresponding to audio output channels. Thus, the location filters include a center channel output filter 502, a right front output filter 504, a left front output filter 506, a right side output filter 508, a left side output filter 510, a right rear output filter 512, and a left rear output filter 514. In this example, the output filters 502, 504, 506, 508, 510, 512 and 514 may correspond to the output channels driving respective loudspeakers, such as center, right front, left front, right side, left side, right rear, and left rear designated loudspeakers in a surround sound audio system, one or more speakers providing a perception of height above or below a listeners ears, or any other speaker location to provide desired effect. In other examples, the output filters 502, 504, 506, 508, 510, 512 and 514 may correspond to interim output channels that are further processed to eventually become part of two or more audio output channels. Fewer or greater numbers of location filters may be represented and used in other examples dependent on need. The locational filter bank 500 includes a first axis identified as a gain axis 518, and a second axis identified as an estimated perceptual location axis 520 that corresponds to the estimated perceptual locations S(ω) (FIG. 4). In FIG. 5, the gain axis 518 is a vertical axis, and the estimated perceptual location axis 520 is a horizontal axis.

Each of the filters may be constructed and implemented by the audio processor 118 based on the estimated perceptual location of the sound sources across the listener perceived sound stage. The filters may be calculated by the audio processor 118 in the frequency domain, or in the time domain based on analysis of the audio input signal. Using Equations 1 and 2, in the frequency domain, an estimated perceptual location value may be calculated. As previously discussed, in one example, the calculated estimated perceptual location values may be a value between −2 and +2. In other examples, any other range of values may be used for the calculated estimated perceptual location values. Based on a particular calculated estimated perceptual location value, a corresponding gain value may be determined.

In FIG. 5, a crossover point 524 exists at a gain value of about 0.5 on the gain axis 518. The crossover point 524 may mark the beginning of a transition of the sound energy away from a first location and towards a second location. In the case of location filters representative of output channels, the crossover point 524 may indicate the transition of sound energy between a first output channel and a second output channel. In other words, in this example, as the gain value in one channel diminishes, the gain value in another channel may correspondingly increase. Thus, the sound output by adjacently located output channels at any given point in time may be allocated between the adjacently located output channels based on the calculated estimated perceptual location values. For example, the center channel output filter 502 is at a gain of one when the calculated estimated perceptual location value is at zero, whereas when the calculated estimated perceptual location value is at −0.5, the gain value of the center channel output filter 502 is at about 0.15, and the gain value of the left front channel output filter 506 is at about 0.85. The crossover point 524 may be adjusted based on the filter structure characterized by the slope of the lines representing each of the location filters.

Thus, by calculating the estimated perceptual location 520 at an instant in time, the audio processing system may develop corresponding gain values for the output filters for the same instant in time. As previously discussed, the audio input signal is divided into frequency bands. Accordingly, the calculated gain values are calculated within each frequency band based on application of Equations 1 and 2 to the portion of the audio input signal in each respective frequency band to calculate an estimated perceptual location 520. The crossover point 524 as shown in FIG. 5 may occur at gain values other than 0.5. The location filters 502, 504, 506, 508, 510, 512 and 514 in the example shown in FIG. 5 only overlap with adjacent filters. Other location filter structures can be used having more or less overlap between adjacent filters. Location filter structures may be devised wherein more than two location filters have non-zero gain values for a given estimated perceptual location $S(\omega)$ of the sound sources across the listener perceived sound stage. Additionally or alternatively, the gain values of the location filters can be both positive and negative.

Figure 6:
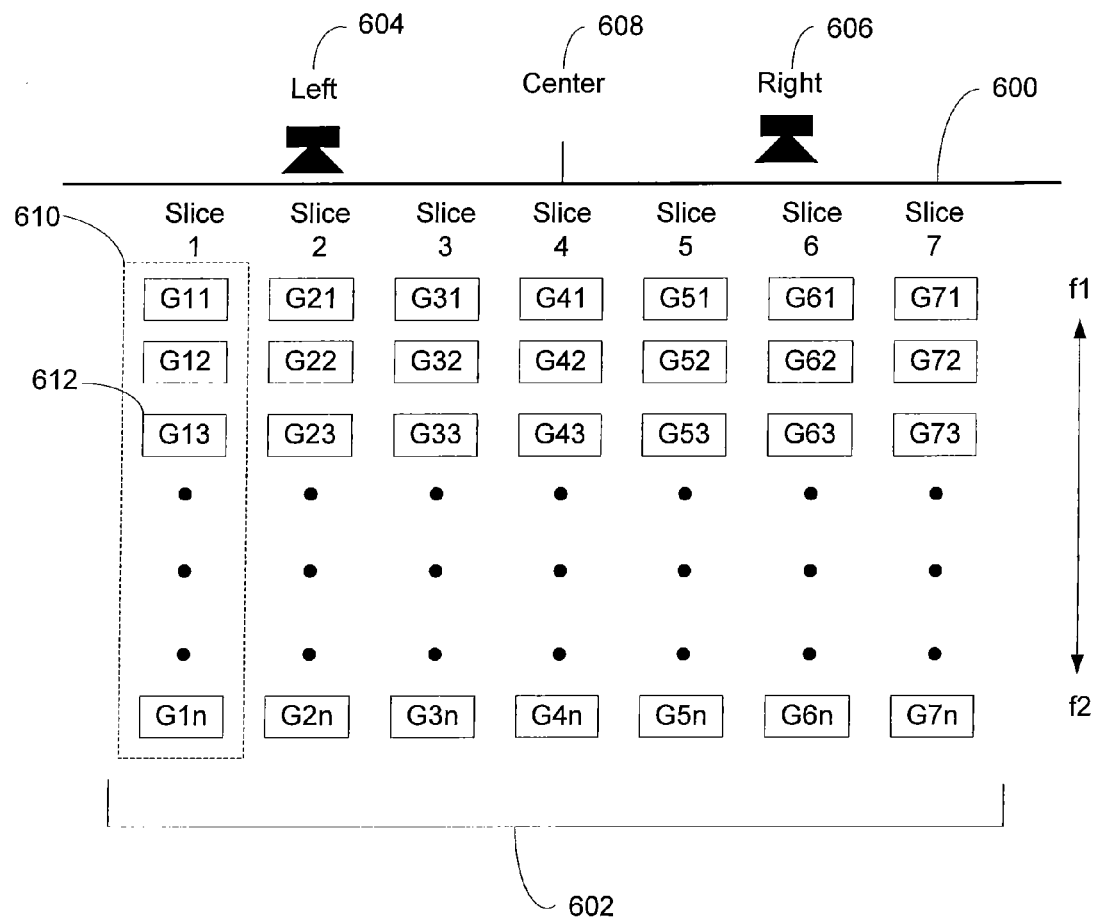
FIG. 6 is an example of a listener perceived sound stage and a plurality of gain vectors in a plurality of spatial slices.

FIG. 6 is an example representation of a listener perceived sound stage 600 depicting a predetermined number (x) of perceptual locations or spatial slices 602 across the listener perceived sound stage 600 at an instant in time. As previously discussed, although seven spatial slices are shown, any number (x) of spatial slices 602 are possible. In FIG. 6, the listener perceived sound stage 600 includes a left loudspeaker 604 and a right loudspeaker 606 that are generally symmetrical about a center 608. In other examples, other configurations of a listener perceived sound stage may be implemented, such as the surround sound listener perceived stage illustrated in FIG. 3.

As previously discussed, Equations 1 and 2 are applied to the audio input signal that has been divided into predetermined bands of frequency, or frequency bins. Based on the calculated estimated perceptual location values the gain values may be derived as also previously discussed. The gain values may be included in a location filter represented with a gain location vector 610 for each one of the spatial slices 602. Each gain location vector 610 may include gain values 612 such as gain values ranging from zero to one.

In FIG. 6, the gain values 612 are represented as Gsn, where "s" is the spatial slice number and "n" is the frequency band position in the respective gain location vector 610 corresponding to the frequency bin number. Each of the gain location vectors 610 may vertically represent the frequency range of the audio input signal from a first predetermined frequency (f1) to a second predetermined frequency (f2) within a particular one of the spatial slices 602. The number of gain values 612 in each of the gain location vectors 610 may correspond to the number (n) of frequency bins (Bn) into which the audio input signal has been divided. As previously discussed, the audio input signal may be divided into a predetermined number (n) of frequency bins, such as 1024 bins, across a predetermined range of frequency (f1 to f2), such as 0 Hz to 20 kHz. Thus, in one example, each of the gain location vectors 610 may include 1024 gain values 612 (n=0 to 1023) across the frequency range from 0 Hz to 24 kHz resulting in a gain value for each predetermined portion of the bandwidth (or frequency bin), such as about 46.875 Hz wide increments of the total frequency range, when the sample rate of the audio input signal is 48 kHz.

During operation, the audio input signal may be applied to the gain location filters. For each instant in time, each of the gain values 612 within each of the gain location vectors 610 may be multiplied by the portion of the audio input signal (In) in the corresponding frequency bins (Bn) as follows:

$$S_{sn} = G_{sn} * I_n \qquad \text{(Equation 4)}$$

Where $S_{sn}$ is the sound source value in a spatial slice number "s" corresponding to frequency bin number "n."

The resulting sound source vector (Ss) formed from the array of sound source values (Ssn) in each of the spatial slices may populate the spatial slices 602 with respective sound sources, for that instant in time. Each of the sound source values ("n" sound source values) in the sound source vector (Ss) may be distributed across the predetermined frequency range (f1 to f2) in accordance with the frequency bins (Bn) similar to the gain values. Thus, the frequency range of a sound source in a particular spatial slice 602 may be fully represented across the predetermined frequency range from f1 to f2. In addition, horizontally across the "s" spatial slices 602 in any given band of frequency corresponding to a frequency bin (Bn) all of the sound sources present across the listener perceived sound stage 600 in an audio input signal may be represented. Since the gain values 612 are applied horizontally across the listener perceived sound stage to the same frequency bin (Bn), if the gain values 612 are added up across the spatial slices (s) 602 in a given frequency band (n), the result may equal the maximum gain value. For example, if the range of gain values is zero to one, the horizontal sum of the gain values 612 across all of the spatial slices 602 for a first frequency bin (B1) may be equal to one.

The sound source vectors (Ss) in each respective spatial slice 602 may represent one or more sound sources, or sources of audible sound, across the listener perceived sound stage. The audio input signal (audio source material) may have been produced, or mixed, by a mixing engineer to perceptually locate each sound source. For example, the sound engineer may strive to produce (or mix) a stereo audio recording so that when the audio recording is played back through an audio system the listeners will perceive themselves to be positioned in a seat near the front of a concert hall, near the center of a stage where a group of musicians are playing musical instruments and singing. In this example, the sound engineer could have mixed the audio recording to distribute the members of the band across the listener perceived sound stage such that, for example, a singer is positioned near the center of the sound stage, a bass guitar is positioned to the left on the listener perceived sound stage, a piano is positioned to the right on the sound stage, and so on. In another example, when the audio recording is being produced as a surround sound audio recording, the sound engineer may desire the listeners to perceive themselves as being part of an audience in the concert hall in which other listeners present in the audience and included in the recording are perceived as being behind and/or beside the listener.

Each of the sound sources may now be included in a separate sound source vector (Ss) in a respective spatial slice. Thus, manipulation and further processing of individual sound sources may be performed by further processing individual sound source vectors (Ss). If the number of location filters in a locational filter bank is equal to the number of audio output channels, each of the sound source vectors (Ss)

may be used as source material to drive a loudspeaker. Alternatively, where the number of audio output channels is greater than or less than the number of sound source vectors (Ss), the sound source vectors (Ss) may be assembled, combined, divided, duplicated, passed through, and/or otherwise processed to generate the audio output signal to include a respective number of audio output channels containing the sound source vectors. The audio output channels included in the audio output signal may also be further processed prior to being output to drive one or more respective loudspeakers.

Figure 7:
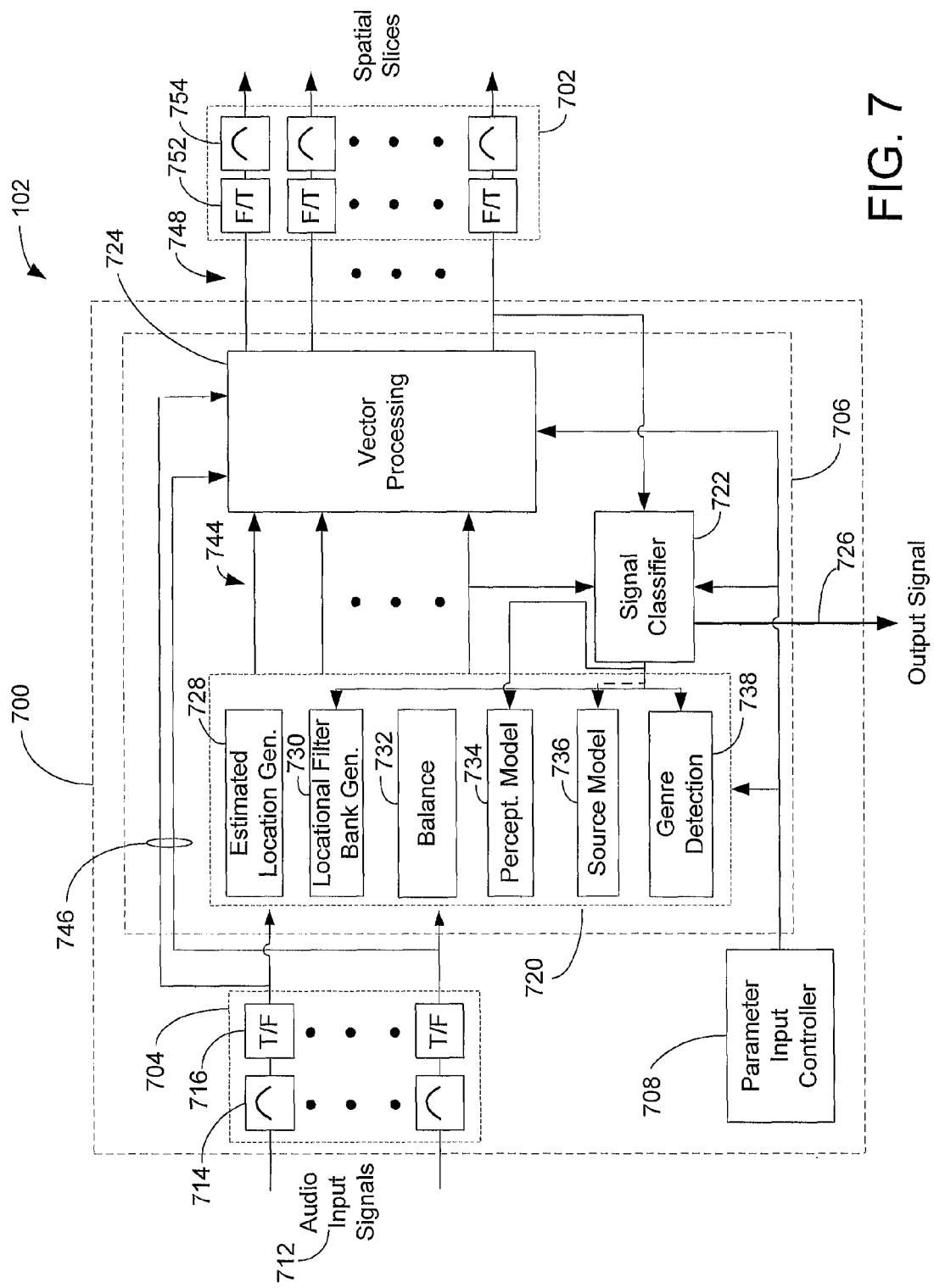
FIG. 7 is a block diagram example of the audio processing system of FIG. 1.

FIG. 7 is a block diagram example of the functional processing blocks of an audio processing system 102 operating in the frequency domain. The audio processing system 102 includes an audio input signal dissection module 700 and a post-processing module 702. The audio input signal dissection module 700 includes an audio input pre-processing module 704, a sound source vector generation module 706, and a parameter input controller module 708. In other examples, additional or fewer modules may be used to describe the functionality of the audio processing system 102. As used herein, the term "module" or "modules" is defined as software (computer code, instructions) or hardware (such as circuits, electrical components and/or logic), or a combination of software and hardware.

In FIG. 7, the audio input pre-processing module 704 may receive audio input signals 712. The audio input signals 712 may be a stereo pair of input signals, multi channel audio input signals, such as 5 channel, 6 channel or 7 channel input signals, or any other number of audio input signals greater than or equal to two audio input signals. The audio input pre-processing module 704 may include any form of time domain to frequency domain conversion process. In FIG. 7, the audio input pre-processing module 704 includes a windowing module 714 and converter 716 for each of the audio input signals 712. The windowing module 714 and the converter 716 may perform overlapping window analysis to a block of time samples and converting the samples with Discrete Fourier Transform (DFT), or other transformation process. In other examples, processing of the audio input signals may be performed in the time domain, and the audio input pre-processing module 704 may be omitted from the audio input signal processing module 700, and may be replaced by a time domain filter bank The pre-processed (or not) audio input signals may be provided to the sound source vector generation module 706. The sound source vector generation module 706 may generate the sound source generation vectors (Ss). The sound source vector generation module 706 may include a gain vector generation module 720, a signal classifier module 722, and a vector processing module 724. The gain vector generation module 720 may generate the gain location vectors 610 for each of the spatial slices 602 as discussed with reference to FIG. 6.

Generation of gain location vectors with the gain vector generation module 720 may include processing with an estimated location generation module 728, a locational filter bank generation module 730, a balance module 732, a perceptual model 734, a source model 736, and a genre detection module 738. The estimate location generation module 728 may calculate the estimated perceptual location values using Equation 1 as previously discussed. The locational filter bank generation module 730 may calculate the locational filter bank 500 as previously discussed with reference to FIG. 5, and the balance module may use Equation 2 to calculate sound source generation vectors (Ss).

The perceptual model 734 and the source model 736 may be used to improve processing to develop the gain location vectors with the estimated location generation module 728, the locational filter bank generation module 730, and the balance module 732. In general, the perceptual model 734 and the source model 736 may cooperatively operate to enable adjustments in calculation of the gain location vectors on a snapshot-by-snapshot basis to compensate for abrupt changes in the calculated locations of sources of audible sound within the listener perceived sound stage. For example, the perceptual model 734 and the source model 736 may compensate for abrupt changes in the existence and amplitude of a particular sound source in the listener perceived sound stage that could otherwise cause abrupt shifts in perceived location. The perceptual model may perform smoothing of the gain location vectors based on at least one of temporal-based auditory masking estimates, and frequency-based auditory masking estimates during generation of the gain location vectors over time (e.g. over a number of snapshots). The source model 736 may monitor the audio input signal and provide smoothing to avoid exceeding a predetermined rate of change in amplitude and frequency of the audio input signal over a predetermined number of snapshots.

Monitoring may be performed for each snapshot, or moment in time of the audio input signal on a frequency bin by frequency bin basis taking into account at least one of the previous snapshots. In one example, two previous snapshots are individually weighted with predetermined weighting factors, averaged and used for comparison to the current snapshot. The most recent previous snapshot may have a higher predetermined weighting than the older snapshot. Upon identification by the source model 736 of changes in amplitude or frequency that exceed the predetermined rate of change, the perceptual model 734 may automatically and dynamically smooth the gain values in the gain location vectors to reduce the rate of change in the perceived location of sources or audible sound, or audio sources, included in the perceived sound stage of the audio input signal. For example, when multiple audio sources are sometimes together in the same perceptual location, or spatial slice, and sometimes occupy different perceptual locations at different instants in time, smoothing may be used to avoid having audio sources appear to "jump" between perceptual locations. Such quick movements between perceptual locations may otherwise be perceived by a listener as an audio source jumping from one of the loudspeakers being driven by a first output channel to another of the loudspeakers being driven by a second output channel.

Alternatively, or in addition, the source model 736 may be used to define the boundaries of the perceptual locations or spatial slices where the perceptual locations are automatically adjustable in accordance with the audio sources identified in the audio input signal based on sources included in the source model 736. Thus, if an audio source is identified as being in more than one perceptual location, an area representative of a perceptual location may be increased or decreased by adjusting the boundaries of the perceptual location. For example, the area of a perceptual location may be widened by adjustment of the crossover points of the filters in the locational filter bank 500 (FIG. 5) so that the entire audio source is in a single perceptual location. In another example, if two or more audio sources are determined to be in the same perceptual location, the boundaries of the perceptual location, or spatial slice may be gradually reduced until the audio sources appear in separate spatial slices. Multiple audio sources in a single perceptual location may be identified by, for example, identifying sources in the source model that correspond to the different operational frequency ranges of the identified sources. The boundaries of other spatial slices may also be automatically adjusted. As previously discussed, the boundaries of the perceptual locations may overlap, be spaced away from one another, or may be contiguously aligned.

The perceptual model 734 may also smooth over time the gain values included in the gain location vectors to maintain smooth transitions from one moment in time to the next. The source model 736 may include models of different audio sources included in the audio input signal. During operation, the source model 736 may monitor the audio input signal and regulate the smoothing processing with the perceptual model 734. As an example, the source model 736 may detect sudden onsets of a sound source such as a drum, and may cause the perceptual model 734 to reduce the amount of smoothing in order to capture the onset of the drum at a unique location in space rather than smear it across spatial slices. Using the models included in the source model 736, the perceptual model 734 may account for the physical characteristics of a sound source included in the audio input signal when deciding how much a given frequency band should be attenuated. Although illustrated in FIG. 7 as separate modules, the perceptual model 734 and the source model 736 may be combined in other examples.

The genre detection module 738 may detect a genre of an audio input signal, such as classical music, jazz music, rock music, talk. The genre detection module 738 may analyze the audio input signal to classify the audio input signal. Alternatively, or in addition, the genre detection module 738 may receive and decode data included with the audio input signal, radio data system (RDS) data, or any other form of externally provided information to determine and classify the audio input signal as being a particular genre. The genre information determined by the genre detection module 738 may also be provided to the other modules in the gain vector generation module 720. For example, in a surround sound application, the locational filter bank generation module 730 may receive indication from the genre detection module 738 that the genre is classical music and automatically adjust the locational filter bank 500 (FIG. 5) by adjustment of the crossover points of the filters in the locational filter bank 500 (FIG. 5) to avoid any portion of the audio input signal being output to the right rear and left rear audio output channels.

The signal classifier module 722 may operate on each of the perceptual locations (spatial slices) across the listener perceived sound stage to identify one or more audio sources included in a respective one of the perceptual locations. The signal classifier module 722 may identify sound sources from the sound source vectors (Ss). For example, in a first one of the perceptual locations, the signal classifier module 722 may identify a respective audio source as a voice of a singer, in a second perceptual location the respective audio source may be identified as a particular musical instrument, such as a trumpet, in a third perceptual location multiple respective audio sources may be identified, such as a voice and a particular musical instrument, and in a fourth perceptual location in the listener perceived sound stage the respective audio source may be identified as audience noise, such as applause. Identification of the audio sources may be based on signal analysis of the audible sound included in a particular perceptual location.

The signal classifier module 722 may base its identification of sound sources on received input information from the parameter input controller 708, output signals of the vector generation module 720, and/or output signals of the vector processing module 724. For example, identification may be based on frequency, amplitude and spectral characteristics of the sound source vectors (Ss) in view of the location gain location vectors and parameters, such as an RDS data signal provided from the parameter input controller 708. Accordingly, the signal classifier module 722 may perform classification of one or more audio sources included in each of the respective perceptual locations in the listener perceived sound stage. Classification may be based on comparison, such as with a library of predefined sound sources, frequencies or tonal characteristics. Alternatively, or in addition, classification may be based on frequency analysis, tonal characteristics, or any other mechanism or technique for performing source classification. For example, classification of sound sources may be based on extraction and/or analysis of reverberation content included in the input signals, use of an estimation of the noise included in the input signals, detection of speech included in the input signals, detection of a particular audio source included in the input signal based on known distinguishing characteristics of the audio source, such as relatively sudden onset characteristics of a drum.

The signal classifier module 722 may cause the vector processing module 724 to assign a given sound source within a given spatial slice to a given output channel. For example, a vocal signal may be assigned to a given output channel (e.g. the center output channel) regardless of where the vocal signal was located in the listener perceived soundstage. In another example, a signal identified as conversational speech (such as talk) may be assigned to more than one output channel in order to obtain a desired sound field, such as to be more pleasing, increase intelligibility, or any other reason.

In FIG. 7, the classification of the spatial slices may be provided as feedback audio classification signals to each of: 1) the locational filter bank generation module 730, 2) the perceptual model 734, 3) the source model 736 and 4) the genre detection module 738. The feedback audio source classification signals may include identification of each perceptual location across a listener perceived sound stage, and identification of one or more audio sources included in each perceptual location. Each of the modules may use the feedback audio source classification signals in performing their respective processing of subsequent snapshots of the audio input signal.

For example, the locational filter bank generation module 730 may adjust an area of the perceptual location by adjustment of the location and/or the width of the output filters in the locational filter bank in order to capture all, or substantially all, of the frequency components of a given sound source within a predetermined number of spatial slices, such as a single spatial slice. For example, the location and/or the width of a spatial slice may be adjusted by adjustment of the crossover points of the filters in the locational filter bank 500 (FIG. 5) to track and capture an identified audio source within an audio input signal, such as an audio source identified to be a vocal signal. The perceptual model 734 may use the audio source classification signals to adjust masking estimates based on predetermined parameters. Example predetermined parameters include whether or not the sound source has a strong harmonic structure, and/or whether the sound source has sharp onsets. The source model 736 may use the feedback audio source classification signals to identify the audio sources in the spatial slices of the listener perceived sound stage. For example, where the feedback audio source classification signals indicate voice audio sources in some perceptual locations, and music audio sources in other perceptual locations, the source model 736 may apply voice and music based models to the different perceptual locations of the audio input signal.

The signal classifier module 722 may also provide indication of the classification of the spatial slices on a classifier output line 726. The classification data output on the classifier output line 726 may be any format compatible with the receiver of the classification data. The classification data may include identification of the spatial slice and indication of the sound source(s) contained within the respective spatial slice. The receiver of the classification data may be a storage device having a database or other data retention and organization mechanism, a computing device, or any other internal module or external device or module. The classification data may be stored in association with other data such as the audio data for which the classification data was generated. For example, the classification data may be stored in a header or a side chain of the audio data. Offline or realtime processing of the individual spatial slices or the totality of the spatial slices in one or more snapshots may also be performed using the classification data. Offline processing may be performed by devices and systems with computing capabilities. Once stored in association with the audio data, such as in the header or side chain, the classification data may be used as part of the processing of the audio data by other devices and systems. Realtime processing by other computing devices, audio related devices or audio related systems may also use the classification data provided on the output line 726 to process the corresponding audio data The genre detection module 738 may use the audio source classification signals to identify the genre of an audio input signal. For example, where the audio source classification signals indicate only voice in the different perceptual locations, the genre can be identified by the genre detection module 738 as talk.

The gain vector generation module 720 may generate the gain location vectors on gain vector output lines 744 for receipt by the vector processing module 724. The vector processing module 724 may also receive the audio input signals 712 as feed forward audio signals on the audio input signal feed forward lines 746. In FIG. 7, the feed forward audio signals are in the frequency domain, in other examples, the vector processing module 724 may operate in the time domain, or in a combination of the frequency domain and the time domain, and the audio input signals may be provided to the vector processing module 724 in the time domain.

The vector processing module 724 may use Equation 4 to apply the gain location vectors to the audio input signal (feed forward signals) in each of the frequency bins to generate the sound source vectors (Ss) for each spatial slice across the listener perceived sound stage. Individual and independent processing of the sound source vectors (Ss) may also be performed within the vector processing module 724. For example, individual sound source vectors (Ss) may be filtered, or amplitude adjusted prior to being output by the vector processing module 724. In addition, effects may be added to certain of the sound source vector (Ss), such as additional reverb may be added to the singer's voice. Individual sound source vectors (Ss) may also be independently delayed, or altered, reconstructed, enhanced, or repaired as part of the processing by the vector processing module 724. The sound source vectors (Ss) may also be smoothed or otherwise individually processed prior to being output by the vector processing module 724. In addition, the sound source vectors (Ss) may be assembled, such as combined or divided, by the vector processing module 724 prior to being output. Accordingly, original recordings may be "adjusted" to improve the quality of the playback based on the level of individual spatial slice adjustments.

Following processing with the vector processing module 724, the processed sound source vectors (Ss) may be output as sound source vector signals on the vector output lines 748. Each of the sound source vector signals may be representative of one or more separate audio sources from within the audio input signal. The sound source vector signals may be provided as input signals to the signal classifier module 722 and the post-processing module 702.

The parameter input controller 708 may selectively provide parameter inputs to the gain vector generation module 720, the signal classifier module 722, and the vector processing module 724. The parameter inputs may be any signal or indication useable by the modules to influence, modify and/or improve the processing to generate the gain location vectors and/or the processed sound source vectors (Ss). For example, in the case of a vehicle, the parameter inputs may include external signals such as engine noise, road noise, microphones and accelerometers located inside and outside the vehicle, vehicle speed, climate control settings, convertible top up or down, volume of the sound system, RDS data, the source of the audio input signals, such as a compact disc (CD), a digital video decoder (DVD), AM/FM/satellite radio, a cellular telephone, a Bluetooth connection, an MP3 player, an Ipod®, or any other source of audio input signals. Other parameter inputs may include an indication that the audio signal has been compressed by a lossy perceptual audio codec, the type of codec used (such as MP3), and/or the bitrate at which the input signal was encoded. Similarly, for the case of speech signals, parameter inputs may include an indication of the type of speech codec employed, the bitrate at which it was encoded, and/or an indication of voice activity within the input signal. In other examples, any other parameters may be provided that are useful to audio processing.

Within the gain vector generation module 720, the parameter inputs may provide information for the genre detection module 738 to detect the genre of the audio input signal. For example, if the parameter inputs indicate that the audio input signal is from a cell phone, the genre detection module 738 may indicate the audio input signal is a voice signal. Parameter inputs provided to the signal classifier 722 may be used to classify the individual audio sources in the spatial slices. For example when the parameter inputs are indicating the audio source is a navigation system, the signal classifier 722 can look for spatial slices that include a voice as the audio source and ignore the other spatial slices. In addition, the parameters may allow the signal classifier 722 to recognize noise or other audio content included in a particular spatial slice with an audio source. The vector processing module 724 may adjust processing of the spatial slices based on the parameters. For example, in the case of a vehicle, the parameter of speed may be used to increase the amplitude of low frequency audio sources, or certain spatial slices, or certain sound source vectors at higher speeds.

In FIG. 7, the sound source vector signals may be processed through the post-processing module 702 to convert from the frequency domain to the time domain using processes similar to the pre-processing module 704. Thus, the post-processing module 702 may include a converter 752 and a windowing module 754 the sound source vector signals. The converter 752 and the windowing module 754 may use a Discrete Fourier Transform (DFT), or other transformation process to convert the blocks of time samples. In other examples, different frequency domain to time domain conversion processes may be used. In still other examples, the sound source vector signals provided on the vector output lines 748 may be in the time domain due to processing with the sound source vector processing module 706 being at least partially performed in the time domain, and the post processing module 702 may be omitted. The sound source vector signals, or post-processed sound source vector signals, are representative of the audio sources divided into the spatial slices and may be subject to further processing, may be used to drive loudspeakers in a listening space, or may be used for any other audio processing related activities.

Figure 8:
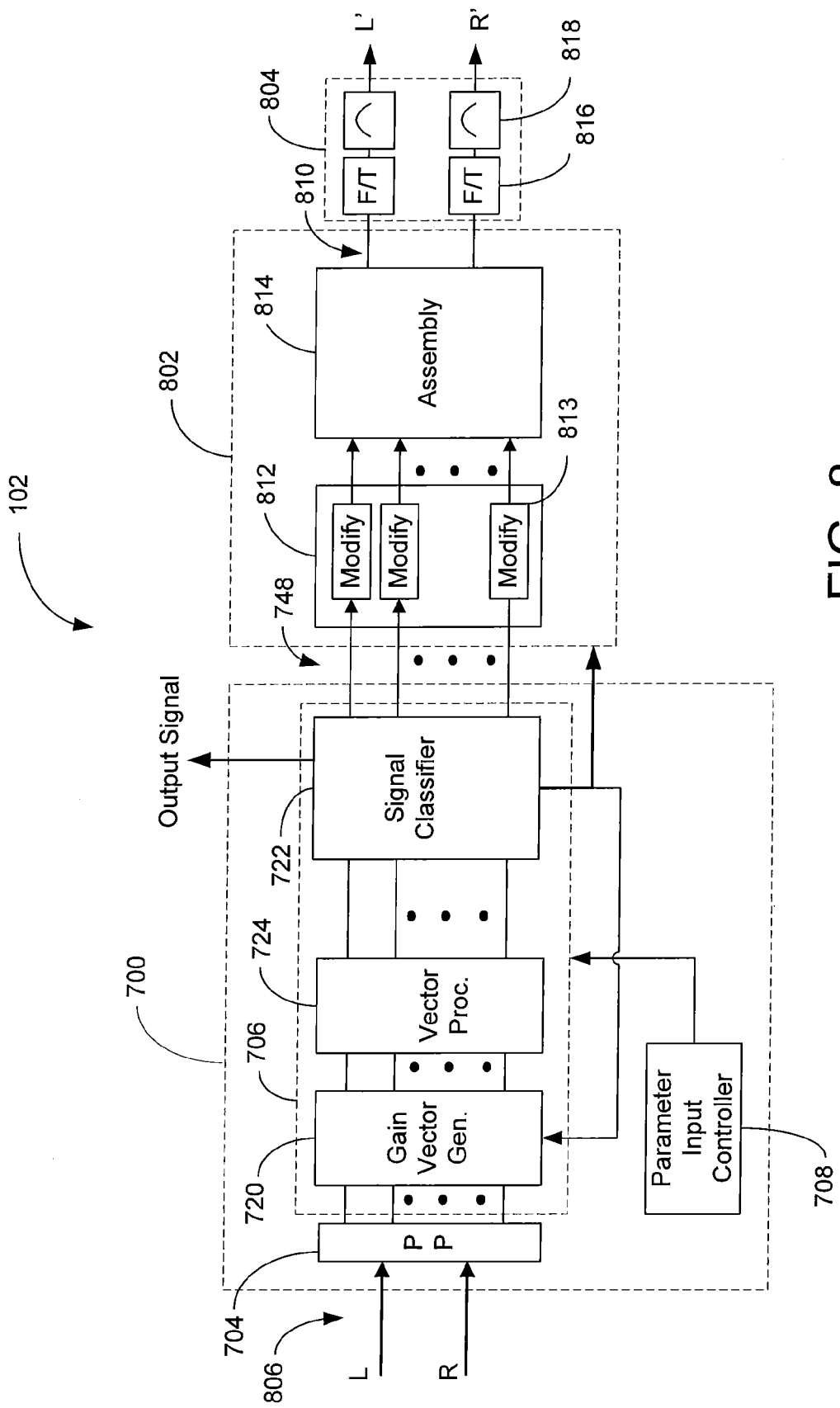
FIG. 8 is another block diagram example of the audio processing system of FIG. 1.

FIG. 8 is a block diagram of another example of the audio processing system 102 that may include the audio input signal dissection module 700, a sound source vector processing module 802, and a post-processing module 804. The audio input dissection module 700 may include the pre-processing module 704, the sound source vector generation module 706, and the parameter input controller 708. In addition, the sound source vector generation module 706 may include the gain vector generation module 720, the signal classifier module 722, and the vector processing module 724 as previously discussed.

In FIG. 8, the pre-processing module 704 receives audio input signals 806 in the form of a left stereo signal (L) and right stereo signal (R). In other examples, any number of audio input signals could be provided. The audio input signals 806 may be converted to the frequency domain with the pre-processing module 704, or may be received directly by the sound source vector generation module 706 in the time domain, as previously discussed.

The sound source vector generation module 706 may generate the sound source vectors (Ss) on the vector output lines 748 using the gain vector generation module 720, the signal classifier module 722, and the vector processing module 724 as also previously discussed. The sound source vectors (Ss) on the vector output lines 748 may be received by the sound source vector processing module 802. The sound source vector processing module 802 may also receive audio classification signals from the signal classifier module 722 indicating the identity of the audio sources in the respective spatial slices (sound source vectors (Ss)).

The sound source vector processing module 802 may generate audio output channels on the output channel lines 810 based on the processed sound source vectors (Ss). The sound source vector processing module 802 may include a sound source vector modification module 812 and an assembly module 814.

The sound source vector modification module 812 may include similar functionality to that previously described with respect to the vector processing module 724. The sound source vector modification module 812 includes a plurality of modify blocks 813 individually operable on each of the processed sound source vectors (Ss). Thus, the sound source vector modification module 812 may be used to add reverberation, perform equalization, add delay, add effects, perform dynamic range compression or expansion, enhance transients, extend the signal bandwidth, interpolate and/or extrapolate to reconstruct missing signal components, and/or perform any other audio processing related activities on a sound source vector (Ss)-by-sound source vector (Ss) basis. Processing within the sound source vector modification module 812 may be used to repair, restore, and enhance degraded audio signals. As such, individual spatial slices across the listener perceived sound stage may be independently modified, adjusted, and/or compensated without affecting any other audio sources in the other sound source vectors (Ss). For example, delay of particular spatial slices may be performed to emphasize the perception of certain spatial slices, or to alter the perceived width of the perceived soundstage.

The sound source vector modification module 812 may also perform modification of the individual sound source vectors (Ss) based on identification of audio sources in the individual vectors. As previously discussed, the signal classifier module 722 may operate on each of the perceptual locations across the listener perceived sound stage to identify one or more audio sources included in a respective one of the perceptual locations. Following identification of the audio sources, the corresponding sound source vectors (Ss) may be modified based on the identified audio source. In contrast to the vector processing module 724 which uses the identification of the audio sources as a feedback for processing subsequent snapshots, the sound source vector modification module 812 is provided the identification of the audio sources as a feed forward. Thus, the sound source vector modification module 812 may process the individual sound source vectors (Ss) based on the identity of the respective audio sources as provided by the signal classifier module 722.

Modification based on identification of the audio sources may include repair of individual audio sources, adjustment of the width of the perceived soundstage and/or of individual audio sources included in the input signal, adjustment of the level of the reverberation, adjustment of the level of speech sources, reduction or removal of a vocal source, enhancement of percussive sources, dynamic range compression or expansion, bandwidth extension, extrapolation and/or interpolation to reconstruct missing components of individual audio sources, audio source specific effects or enhancements, and perceptual location adjustments across the listener perceived sound stage. Repair of individual identified audio sources may include replacement of portions of the audio output of a specific audio source from a library or other audio source re-creation device, such as a MIDI player. For example, an audio source identified as a saxophone that includes notes having noisy sound output in certain frequencies may be replaced with the same notes in the same frequencies of saxophone audio outputs from a library or from a source capable of recreating the audio of a saxophone. The input audio signal may be damaged or degraded as a result of processing by a perceptual audio codec, such as an MP3 codec, or any other form of lossy compression. Other sources of degradation/damage include poor audio recording and/or storage practices, AM/FM and satellite radio broadcast, television broadcast, video codecs, wireless connections such as Bluetooth, voice codecs, as well as telephone networks, including cellular networks.

Audio source specific effects or enhancements may include changes to the sound source values included in a particular sound source vector (Ss) that are specific to the identified audio source. For example, an audio source identified as a voice may be increased in amplitude or adjusted in certain frequency bands to make the voice more easily discernable to a listener. Specific sound source vectors (Ss) may be compressed by application of a dynamic range compressor to increase intelligibility of an audio source appearing in more than one sound source vector (Ss). For example, where a speakers voice is present in not only a center sound source vector (Ss) but also adjacent left and right sound source vectors that also include respective musical instruments, or background noise, the center sound source vector may be dynamically compressed, or have its level altered. In another example, a musical instrument, such as a trumpet in a particular sound source vector (Ss) may be equalized to improve clarity.

Perceptual location adjustments may involve moving an identified audio source from one location to another different location in the listener perceived sound field. For example, a sound source such as singer's voice may be in the center channel with a second sound source, such as a guitar in a contiguously located sound source vector (Ss) in the listener perceived sound stage. Once identified with the signal classifier module 722, as a singer's voice and a guitar, the guitar sound source may be moved in the listener perceived sound stage to be spaced further away from the singer's voice by the sound source vector modification module 812. For example, the guitar may be moved over toward the right loudspeaker, with the sound source vector modification module 812 by moving that audio source to another sound source vector (Ss) that was identified as not containing an audio source. The vector processing module 724 operates to identify and/or isolate sound sources and spatial slices as best as possible, while the sound source vector modification module 812 serves to modify the identified and/or isolated sound sources and spatial slices.

Creating the output channels may include combining together or dividing a number of the sound source vectors (Ss) with the assembly module 814 depending on the location in user perceived sound stage of the perceptual location or spatial slice from which the sound source vector (Ss) was derived. For example, in a system with five output channels, the sound source vectors (Ss) from a number of perceptual locations near the center of the listener perceived sound stage may be combined to form a center output channel to drive a center loudspeaker. In another example of a surround sound output system with five channels, where there are only four spatial slices, two of the spatial slices may be combined to form the side or rear output channels. In other examples, the number of perceptual locations or spatial slices may match the number of output channels. As previously discussed, this allows two channel stereo recordings to be converted to 5, 6, 7, or any number of output channels.

The sound source vector (Ss) may also be re-arranged or re-mapped by the assembly module 814 working in conjunction with the sound source vector modification module 812 to move the audio sources in the original audio input signal to different locations in the listener perceived sound stage. Since each of the audio sources in the listener perceived sound stage may be contained in a separate one of the sound source vectors (Ss), the sound sources may be moved or mapped into different locations in the listener perceived sound stage. In other words, since the location in the listener perceived sound stage of each audio source in the audio input signal is determined and captured, and since the audio sources may be separated into individual perceptual locations, or spatial slices, with the sound source vectors (Ss), it can be determined whether the sound sources should be placed in generally the same position in output audio channels, or moved to a new perceptual location in the output audio channels.

For example, if a first perceptual location, or spatial slice, contains a singer's voice, and a second perceptual location located adjacent to the first perceptual location includes a guitar, the singers voice may be allocated or mapped to the center output, channel, and the guitar may be allocated or mapped to both the left and right sides of the listener perceived sound stage separated away from the singer's voice. The singer's voice and the guitar may be separated by appropriately mapping the sound source vector (Ss) containing the singers voice into the center output channel, and mapping the sound source vector (Ss) containing the guitar into the left and right front, side and/or rear output channels with the assembly module 814. Thus, the audio processing system 102 may not only convert a two channel audio input signal into any number of multi-channel output signals, such as a surround sound output signals, but also allow individual audio sources in the audio input signal to be allocated to any of one or more of the desired output channels.

In addition, a sound source vector (Ss) may be allocated to two different output channels so that when the output channels drive adjacently positioned loudspeakers, the audio source included in the sound source vector (Ss) is perceptually perceived as located between the two loudspeakers. Further, in particular applications, such as when loudspeakers are located in a vehicle at different heights and orientations, such as in door panels, a dashboard or a rear deck of the vehicle, the sound source vectors (Ss) may be selectively allocated proportionally in view of the loudspeaker locations to optimize the listening experience at the driver and passenger seats in the vehicle. Also, groups of sound source vectors (Ss) may be statically mapped to one or more output channels. Alternatively, sound source vectors (Ss) may be dynamically grouped by the assembly module 814 such that different sound source vectors (Ss) may appear in one or more output channels for a period of time and then move to one or more other output channels automatically based on external parameters from the parameter input controller 708, the content of the audio input signal, or any other criteria to useable to trigger a change in the mapping of the sound source vectors (Ss) to the output channels. Accordingly, mapping of the sound source vectors (Ss) to the output channels may be one-to-one mapping, or one-to-many mapping, or many-to-one mapping. The mappings of some or all of the sound source vectors (Ss) may be such that the Left input signal is mapped to output channels (and subsequently to speakers) on the left side of a playback speaker array, and the Right input signal is mapped to output channels (and subsequently to speakers) on the right side of the playback speaker array. Additionally, or alternatively, the mappings of some or all of the sound source vectors (Ss) may be such that the Left input signal is mapped to output channels on the Right side of the speaker array, and/or the Right input signal is mapped to output channels on the Left side of the speaker array. Additionally, or alternatively, the mappings of some or all of the sound source vectors (Ss) may be such that the Left input signal is mapped to output channels on both sides of the speaker array, and/or the Right input signal is mapped to output channels on both sides of the speaker array. The choice of mappings may be predetermined and set by a user as required to obtain a desired listener perceived soundstage for the output signals. The mapping of the sound source vectors (Ss) to the output channels may be frequency dependent such that the mapping may vary with frequency. In one example, frequency dependent mapping may be used to obtain better and more stable spatial images in the reproduced soundstage.

The audio output channels on the output channel lines 810 may be received by the post-processing module 804. The post-processing module 804 may convert the frequency based audio output channels to a time-based audio output channels using any form of frequency domain to time domain conversion process. In FIG. 8, the post processing module 804 includes a converter 816 and a windowing module 818 for each of the audio output channels included in the audio output signal. The converter 816 and the windowing module 818 may use a Discrete Fourier Transform (DFT), or other transformation process to convert to blocks of time samples. In other examples, the audio output channels provided on the output channel lines may be in the time domain due to processing with the sound source vector processing module 706 being at least partially performed in the time domain, and the post processing module 804 may be omitted.

Figure 9:
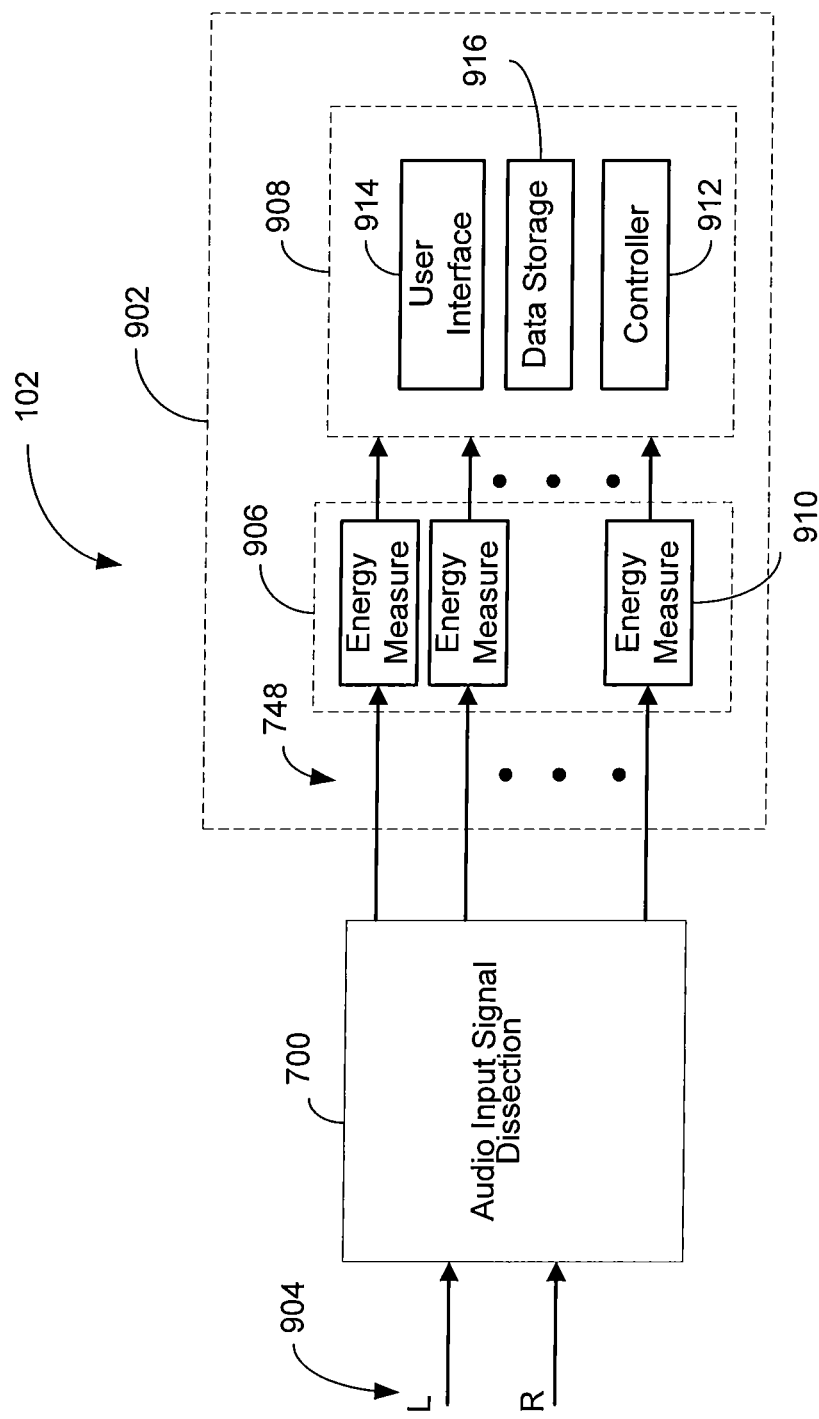
FIG. 9 is another block diagram example of the audio processing system of FIG. 1.

FIG. 9 is a block diagram of another example of the audio processing system 102 that may include the audio input signal dissection module 700 and a system management module 902. As previously discussed, the audio input signal dissection module 700 may include the pre-processing block 704, the sound source vector generation module 706, and the parameter input controller 708. In addition, the sound source vector generation module 706 may include the gain vector generation module 720, the signal classifier 722, and the vector processing module 724. Based on audio input signals 904, the audio input signal dissection module 700 may generate the sound source vectors (Ss) on the vector output lines 748. In FIG. 9, the audio input signals 904 are illustrated as a left/right stereo pair provided in the time domain. In other examples, any number of audio input signals may be present in either the frequency domain or the time domain.

The sound source vectors (Ss) present on the vector output lines 748 may be received by the system management module 902. The system management module 902 may include an energy measurement module 906, and a system control module 908. The energy measurement module 906 may include vector measurement modules 910 to receive respective sound source vectors (Ss) on the vector output lines 748. The vector measurement modules 910 may each measure an energy level of a respective one of the sound source vectors (Ss). The vector measurement modules 910 may measure the signal level using methods such as an RMS (root-mean-square) based measure, or a peak based measure. Additionally or alternatively vector measurement modules 910 may measure the perceived loudness of the signal.

The system control module 908 may include a controller 912, a user interface 914, and a data storage module 916. The controller 912 may be a standalone processor similar to the processor 120 described with reference to FIG. 1, or may be representative of functionality performed with the processor 120 (FIG. 1). The user interface 914 may include any visual, audible and/or tactile mechanisms processes or devices that allow a user to provide and receive information from the audio signal processing system 102. For example, the user interface 914 may include a display that converts electrical signals into information presented to the user in some visually perceivable form. Some examples of a display include a liquid crystal display ("LCD"), a cathode-ray tube ("CRT") display, an electroluminescent display ("ELD"), a heads-up display ("HUD"), a plasma display panel ("PDP"), a light emitting diode display ("LED"), or a vacuum fluorescent display ("VFD"). The user interface 914 may receive electrical signals from, and provide electrical signals to the controller 912 that are representative of interaction of the user with the audio signal processing system 102. In one example, the user interface 914 may include a user input device that is electrically connected to the controller 912. The input device may be a wheel button, a joystick, a keypad, a touch-screen configuration or any other device or mechanism capable of receiving an input from a user and providing such an input as an input signal to the controller 912. In another example, the display may be a touch-screen display that transmits signals to the controller 912, or any other module or device included in the audio signal processing system 102. Information such as the area on the display that was touched by the user, the length of time the user touched the display, the direction the user moves his finger against the display, etc., may be conveyed as different signal inputs to the audio signal processing system 102.

The user interface 914 may also include a voice-based interface that allows the user to audibly interact with audio signal processing system 102. The voice-based interface may allow a user to provide input to the audio signal processing system 102 using a microphone and voice recognition software. The user's speech may be converted to electronic signals using the microphone and processed using the voice recognition software to generate text data for the controller 912.

The data storage module 916 may include computer code to enable data logging and storage. The computer code may be in the form of logic and/or instructions that are executable by the controller 912. Execution of the instructions by the controller 912 may provide the functionality to log the energy levels from each of the respective sound source vectors (Ss). In addition, logging of any other data or parameters provided to the audio signal processing system 102, or generated with the audio signal processing system 102 may be logged with the data storage module 916. The data storage module 916 may also include a database maintenance and control tool, or any other form of data organization and storage device. The data storage module 916 may also be included as part of the memory 118 described with reference to FIG. 1.

The audio processing system 102 of FIG. 9 may be used in conjunction with any of the other capabilities of the audio processing systems 102 as previously described. Accordingly, the user interface 914 may include functionality to allow a user of the audio processing system 102 to influence or have control of any of the previously discussed functionality of the audio processing system 102. For example, the user interface 914 may allow the user to manually adjust the width and slope of the individual location filters discussed with reference to FIG. 5. Thus, a user may manually adjust which of the sound source vectors (Ss) a particular sound source included in the audio input signal may be located, such as with a simple control knob. In another example, a user may be provided the capability to manually adjust how the sound source vectors (Ss) are grouped, divided or otherwise manipulated by the assembly module 814 discussed with reference to FIG. 8. Accordingly, where there are more sound source vectors (Ss) than audio output channels, a user may adjust in which loudspeakers a sound source appears, thereby adjusting the perceptual location of the audio source within the listener perceived sound stage. Also, manual inputs from the user to the parameter input controller module 708 described with reference to FIG. 7 may be entered via the user interface 914. Manual adjustment of the sound source vectors (Ss) or the audio sources included in the sound source vectors (Ss) using the sound source vector modification module 812 as discussed with reference to FIG. 8 may also be performed via the user interface 914. The outputs of the vector measurement modules 910 in FIG. 9 may be used by the modify blocks 813 in FIG. 8 to adjust the levels of the processed sound source vectors (Ss) or the audio sources included in the processed sound source vectors (Ss). For example, the modify blocks 813 may boost the energy levels of sound source vectors (Ss) used in the generation of surround audio signals based on the relative energy levels measured with the vector measurement modules 910.

Figure 10:
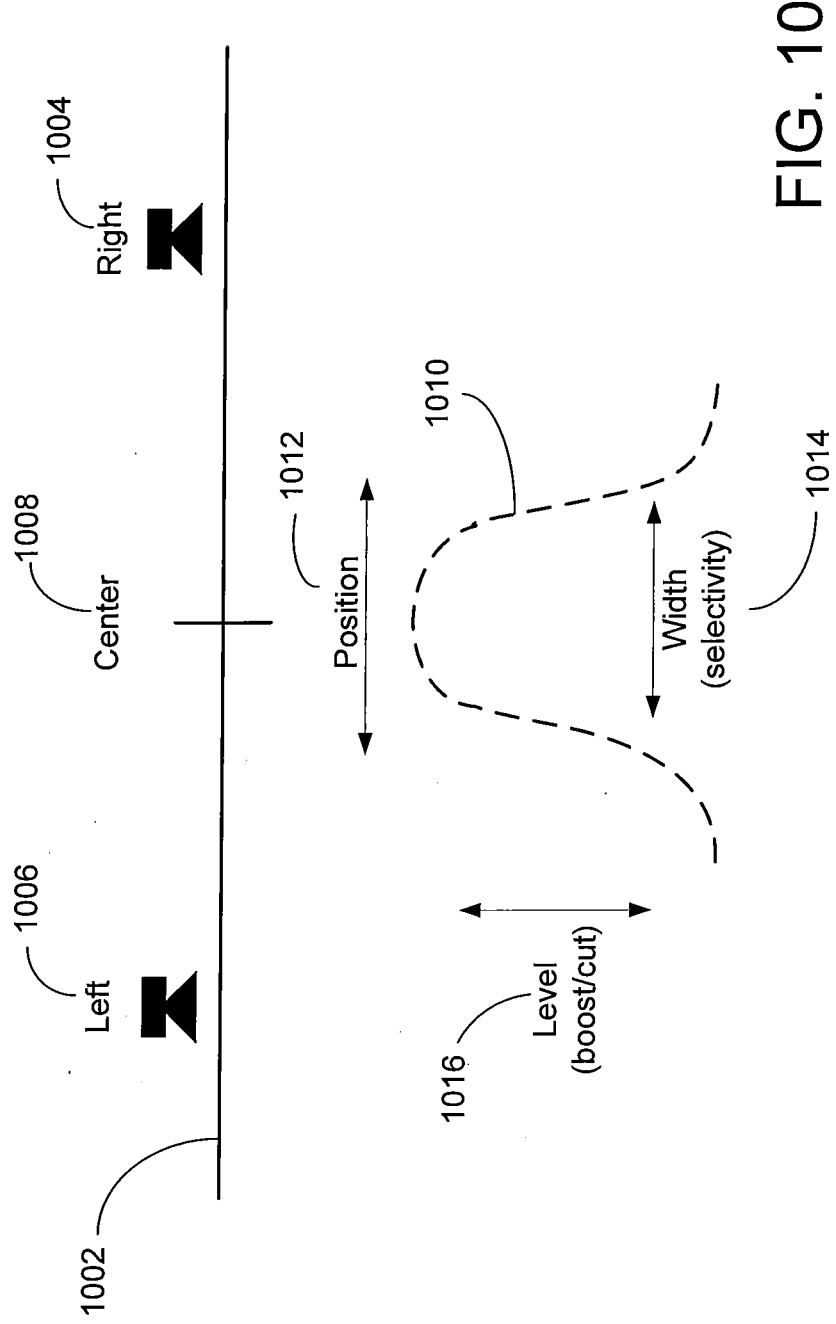
FIG. 10 is another example of a listener perceived sound stage.

FIG. 10 is an example of some adjustments within the audio processing system 102 that may be performed on the sound source vectors (Ss) to achieve a particular effect. The adjustment capabilities may be manually performed by a user, automatically performed by the processor, or performed with some combination of manual and automatic control. FIG. 10 includes a listener perceived audio output sound stage 1002 formed with output audio channels driving a right loudspeaker 1004 and a left loudspeaker 1006. The listener perceived audio output sound stage 1002 includes a center position 1008. In other examples, the listener perceived sound stage 1002 may be a surround sound stage similar to FIG. 3.

In FIG. 10, a center spatial slice 1010 is illustrated. In other examples, any other output channels may be similarly adjusted. The center spatial slice may be adjusted in position within the listener perceived audio output sound stage 1002 as indicated by arrow 1012 by the sound source vector modification module 812 or the assembly module 814. In addition, the width or length of the listener perceived sound stage 1002 that is channeled to the center spatial slice 1010 may also be adjusted as indicated by arrow 1014 by changing the slope of the center spatial filter 502 within the locational filter bank 500 (FIG. 5). Adjustment of the slope of any of the spatial filters will change the crossover point with adjacently located spatial filters. Thus, in the example of FIG. 10, adjustment of the slope of the center spatial filter 502 to make the center spatial slice 1010 narrower may move audio sources away from the center 1008 and towards one or both of the right speaker 1004 and the left speaker 1006 within the listener perceived sound stage 1002. Conversely, adjustment of the slope of the center channel output filter 502 to make the center spatial slice 1010 wider may move audio sources closer to the center 1008 within the listener perceived sound stage 1002.

In addition, or alternatively, an amplitude or magnitude of the audio output channels may be adjusted independently for any of the other audio output channels. In FIG. 10, adjustment of the amplitude of the center output channel is illustrated with arrow 1016. Adjustment of the amplitude may be performed in the sound source vector processing module 802 (FIG. 8) by adjusting the amplitude of the sound vectors included in the sound source vectors (Ss) identified as being within the center output channel 1010.

A specific example application of such amplitude adjustment is in the area of video broadcasts that include audio. Since many video broadcasts, such as television programming, include audio dialogue in a central position within the listener perceived sound stage of the audio input signal, the user may be provided with the capability to boost the dialogue portion of received television programming while leaving unchanged other audio sources included in the audio input signal. Thus, a user, such as a user with hearing aids, who has difficulty hearing the dialogue due to background noise included in the audio input signal may boost the sound source vectors (Ss) associated with the sound source vectors (Ss) associated with the center spatial slice a predetermined amount, such as 6 dB, to effectively boost the dialogue while maintaining the amplitude of the remaining sound source vectors (Ss) substantially unchanged. Once the sound source vectors (Ss) associated with the center spatial slice is boosted, the sound source vectors (Ss) may be reassembled to form one or more output channels, such as a pair of stereo output channels. Alternatively or in addition, a spatial slice other than the center spatial slice that is identified as containing speech can be boosted. In addition, based on identification of the absence of speech in a spatial slice where speech was previously present, the boost may be selectively applied. In another example, commercials received in television programming that include compression to make an announcers voice louder may be reduced in amplitude.

In one example, adjustment of the area of spatial slice 1010 by adjustment of the location and/or the width of the spatial slice 1010 and adjustment of the amplitude of or magnitude of the audio output channels may be performed automatically by the audio processing system based on identification of the audio sources within the listener perceived sound stage, as previously discussed. In addition, or alternatively, such adjustments may be performed manually. For example, a user may have a first adjuster, such as a tuning knob or other form of user interface, that allows moving or sweeping a location of a spatial slice 1010 back and forth across the listener perceived sound stage 1002. The user may have a second adjuster to adjust a width of the spatial slice 1010, and a third adjuster to adjust loudness of audio content within a spatial slice 1010. Thus, the user may adjust the first adjuster to move the spatial slice 1010 around within the listener perceived sound stage 1002 to locate one or more sources of audible sound, such as a guitar, located somewhere within the listener perceived sound stage 1002. Once located, the user may adjust the second adjuster to adjust a width of the spatial slice 1010 to fully encompass the one or more sources of audible sound within the spatial slice 1010. Further, once the user has adjusted the area of the spatial slice as desired using the first and second adjusters, the user may adjust the third adjuster to increase or decrease the loudness of the one or more sources of audible sound that are now encompassed within the spatial slice 1010.

Figure 11:
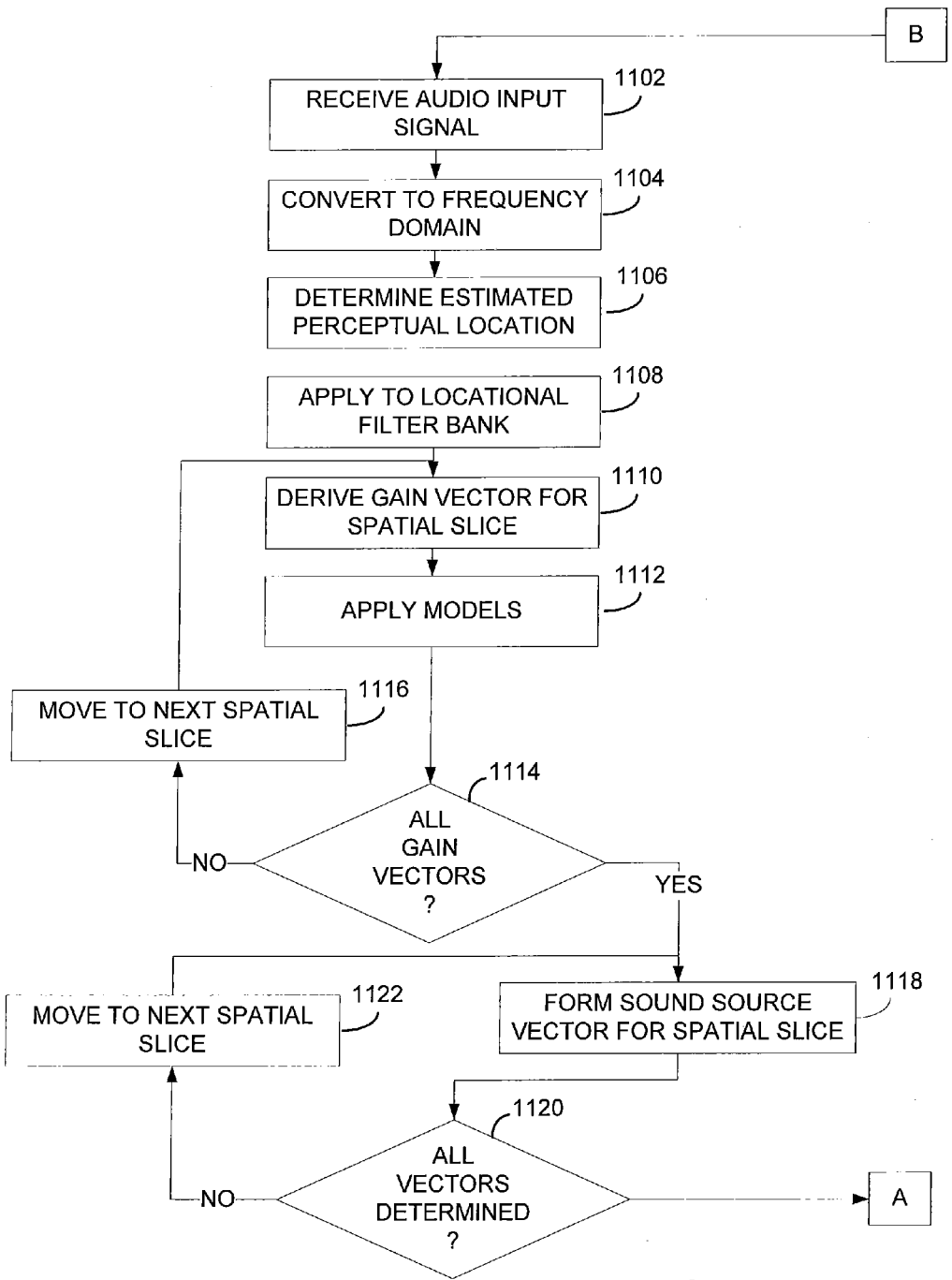
FIG. 11 is an example operational flow diagram of the audio processing system of FIG. 1.

FIG. 11 is a process flow diagram illustrating example audio processing with the audio processing system 102, which will be described with reference to FIGS. 1-10. In this example, the audio signal is provided in the time domain and converted to the frequency domain. In other examples, the audio signal may be received in the frequency domain, and/or the processing may be performed in the time domain and the frequency domain, only the time domain, or only the frequency domain. At block 1102, the audio processing system 102 receives an audio input signal from an audio source. A snapshot or instant in time of the audio input signal is converted from the time domain to the frequency domain and separated into frequency bins at block 1104. At block 1106, the estimated perceptual location $S(\omega)$ of each of the sound sources across a listener perceived sound stage may be determined with the estimated location generation module 728. The estimated perceptual location $S(\omega)$ may be determined based on Equations 1 and 2 as previously discussed. The estimated perceptual locations $S(\omega)$ are applied to the locational filter bank 500 at block 1108.

At block 1110, the gain values are derived for each of the frequency bins to form a respective location gain vector for one of a predetermined, or user selected, number of spatial slices. The perceptual model 734 and the source model 736 may be applied to the gain location vectors at block 1112. At block 1114, it is determined if gain location vectors have been formed for all the spatial slices. If gain location vectors have not been determined for all the spatial slices, a next spatial slice is selected at block 1116 and blocks 1110, 1112 and 1114 are repeated. If, at block 1114, gain location vectors have been determined for all the spatial slices, the operation proceeds to block 1118 to form sound source vectors (Ss) for each of the spatial slices. The portion of the audio input signal in each of the frequency bins may be multiplied by corresponding gain values in each one of the location gain location vectors to generate sound source values (Ssn) to form the sound source vectors (Ss) for each of the spatial slices.

Figure 12:
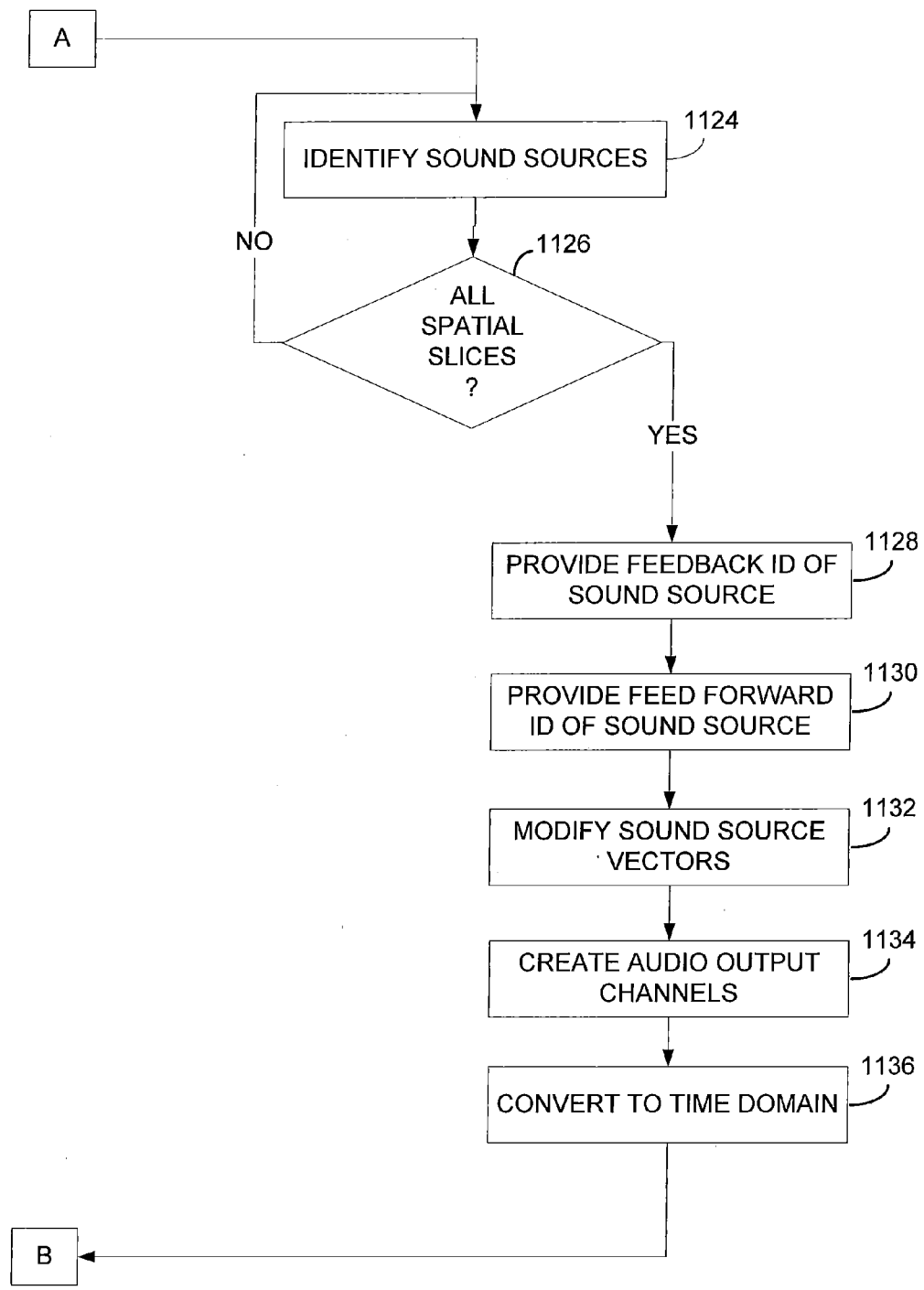
FIG. 12 is a second part of the operational flow diagram of FIG. 11.

At block 1120, it is determined if sound source vectors (Ss) have been determined for each of the spatial slices. If not, at block 1122 the operation moves to the next spatial slice where a sound source vector (Ss) has not yet been determined and repeats blocks 1118 and 1120 until sound source vectors (Ss) have been derived for each of the spatial slices. If sound source vectors (Ss) have been derived for all of the spatial slices at block 1120, the operation proceeds to block 1124 in FIG. 12. At block 1124, each of the sound source vectors (Ss) are analyzed to identify a sound source represented with a respective one or more of the sound source vectors (Ss) with the signal classifier 722.

It is determined at block 1126 if the sound source for each of the spatial slices has been determined. If all of the spatial slices have not been analyzed for sound sources, the operation returns to block 1124 for the signal classifier module 722 to identify additional sound sources in the spatial slices. If, on the other hand, the spatial slices have all been considered, feedback audio source classification signals may be generated for each of the spatial slices and provided to the locational filter bank generation module 730, the perceptual model 734 and the source model 736 at block 1128 for use in processing subsequent snapshots of the audio input signal.

At block 1130, the feedforward audio source classification signals are provided to the sound source vector modification module 812 for further processing of the sound source vectors (Ss) of the presently being processed snapshot of the audio input signal. The sound source vector modification module 812 may modify the sound source vectors (Ss) based on the feedforward audio source classification signals at block 1132. The sound source vectors (Ss) may be assembled, such as recombined, with the assembly module 814 at block 1134 to form an audio output signal containing the audio output channels. At block 1136, the audio output channels may be converted from the frequency domain to the time domain. The operation may then return to block 1104 to convert another snapshot of the audio input signal and perform the operations again.

Using the previously discussed audio processing system, any audio input signal of two channels or more may be dissected to identify perceptual locations of the audio sources contained in the audio input signal by dividing the audio input signal into spatial slices across a listener perceived sound stage. A current snapshot of the audio input signal may be dissected into spatial slices each containing a sound source vector (Ss) to identify the audio sources. Once the audio sources have been divided into sound source vectors (Ss), each of the audio sources may be classified and further processed based on the classification. Alternatively, the audio input signal that has been broken down into spatial slices, and each of the spatial slices containing a sound source vector (Ss) may be independently processed. In other systems, such dissection to process portions of an audio input signal representative of individual sound sources is not possible. Once independent processing of the individual spatial slices is performed, the spatial slices may be further manipulated to form output audio channels. Manipulation may involve moving combining or dividing the spatial slices to form the audio output channels.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. An audio processing system comprising:
   a processor;
   a gain vector generation module executable by the processor to analyze an audio input signal and estimate a plurality of respective perceptual locations, within a listener perceived sound stage, of each of a plurality of audio sources included in the audio input signal;
   the gain vector generation module further executable by the processor to generate location gain vectors for each of the respective perceptual locations;
   a signal classifier module executable by the processor to identify each of the audio sources in each of the perceptual locations based on external non-audio data included in the audio input signal;
   a genre detection module configured to adjust the perceptual location based on an audio genre detected from the non-audio data; and
   a vector processing module executable by the processor to apply the location gain vectors to the audio input signal to generate a plurality of sound source vectors, each of the sound source vectors representative of one of the respective perceptual locations.

2. The audio processing system of claim 1, further comprising a sound source vector processing module executable with the processor to modify the sound source vectors and assemble the sound source vectors to generate an audio output signal configured to drive a plurality of loudspeakers, where the sound source vector processing module is selectively configurable to assemble the sound source vectors so that a number of audio channels in the audio input signal are less than, more than, or equal to a number of channels in the audio output signal.

3. The audio processing system of claim 1, where each of the gain location vectors comprises a plurality of gain values, each of the gain values corresponding to a portion of a total range of frequency of the audio input signal, where the gain values are applied to the portion of the total range of frequency of the audio input signal.

4. The audio processing system of claim 1, where analysis of the audio input signal with the gain vector generation module comprises dividing the audio input signal into a plurality of frequency bins, each of the frequency bins comprising a band of frequency contained within the audio input signal.

5. The audio processing system of claim 1, where the gain vector generation module comprises a locational filter, the perceptual locations applied to the locational filter to generate the location gain vectors.

6. The audio processing system of claim 1, where the location gain vectors and the sound source vectors are repetitively generated at each of a plurality of points in time, the audio processing system further comprising a perceptual model executable with the processor to smooth the gain location vectors based on at least one of temporal-based auditory masking estimates and frequency-based auditory masking estimates over a number of the points in time to avoid abrupt changes in the respective perceptual locations of the audio sources.

7. The audio processing system of claim 1, further comprising a source model executable with the processor to smooth the audio input signal to avoid exceeding a predetermined rate of change in amplitude and frequency of the audio input signal over a predetermined number of snapshots.

8. The audio processing system of claim 1, where the location gain vectors and the sound source vectors are repetitively generated at each of a plurality of points in time, the audio processing system further comprising a perceptual model and a source model executable with the processor, the source model executable to identify changes in amplitude or frequency of the audio input signal that exceed a predetermined rate of change, and the perceptual model executable to dynamically smooth the gain location vectors based on the identified changes in amplitude or frequency that exceed the predetermined rate of change.

9. The audio processing system of claim 1, further comprising a sound source vector processing module executable with the processor to identify a sound source vector representative of a predetermined one of the perceptual locations, and adjust a gain of the sound source vector to adjust an amplitude of a sound source represented in the identified sound source vector, the sound source vector processing module further executable to assemble the gain adjusted sound source vector with the remaining sound source vectors to generate an audio output signal for provision to a plurality of loudspeakers.

10. The system of claim 1, wherein multiple audio sources are identified for a single perceptual location.

11. The system of claim 1, wherein each of the audio sources include an audible sound identified as at least one a voice, musical instrument, and background noise.

12. A method of processing an audio signal comprising:
receiving an audio input signal with an audio processor;
identifying with the audio processor a plurality of perceptual locations of each of a plurality of sources of audible sound represented within the audio input signal, where the perceptual locations are representative of physical locations of the respective sources of audible sound within a listener perceived sound stage;
generating a plurality of filters with the audio processor for each of a plurality of respective output channels based on the identified perceptual locations of the respective sources of audible sound;
identifying an audio source in each of the identified perceptual locations based at least in part on external non-audio data included in the audio input signal;
adjusting an area of one or more of the perceptual locations based at least in part on an audio genre detected from the non-audio data; and
the audio processor applying the filters to the audio input signal to generate a plurality sound source vectors, each of the sound source vectors representative of a portion of the audio input signal.

13. The method of claim 12, further comprising separately and independently modifying each of the sound source vectors to separately and independently modify the portions of the audio input signal.

14. The method of claim 13, further comprising processing the modified sound source vectors with the audio processor to generate an audio output signal configured to drive respective loudspeakers on each of a plurality of respective audio output channels.

15. The method of claim 14, where processing the modified sound source vectors comprises combining a subset of the modified sound source vectors together to form each one of the respective audio output channels.

16. The method of claim 14, where the audio input signal comprises a plurality of audio input channels and a number of the respective audio output channels is greater than or less than a number of the audio input channels.

17. The method of claim 12, where identifying a plurality of perceptual locations comprises separating the audio input signal into a plurality of predetermined bands of frequency and identifying the perceptual locations of one or more of the plurality of sources of audible sound in at least one of the predetermined bands of frequency.

18. The method of claim 17, where identifying the perceptual locations of one or more of the plurality of sources of audible sound comprises assigning a location value from among a predetermined range of location values to each of a plurality of predetermined zones that form the listener perceived sound stage.

19. The method of claim 12, where applying the filters to the audio input signal comprises separating into a number of different sound source vectors a group of the sources of audible sound that are comingled in the audio input signal, where the group of the sources of audible sound are separated based on the identified respective perceptual locations of each of the sources of audible sound in the group.

20. The method of claim 12, where generating a plurality of filters comprises constructing the filters with adjustable crossover points such that an area of the respective perceptual locations represented with each of the filters is adjustable to allocate, within one or more of the perceptual locations, sound energy of the sources of audible sound represented within the audio input signal.

21. The method of claim 20, wherein the adjusting the area of one or more of the perceptual locations includes adjusting at least one of a location and a width of one or more of the respective perceptual locations within the listener perceived sound stage.

22. The method of claim 20, where adjusting at least one of a location and a width of one or more of the perceptual locations includes adjusting adjustable crossover points based on the genre.

23. A non-transitory computer readable medium that includes instructions executable by a processor, the computer readable medium comprising:
instructions to receive an audio input signal;
instructions to generate a plurality of gain location vectors, each of the gain location vectors corresponding to a location in a perceptual sound stage created when the audio input signal is output as audible sound in a listening space, each of the gain location vectors comprising gain values in each of a respective one of a plurality of predetermined bands of frequency of the audio input signal at the corresponding location;
instructions to generate a plurality of location filters for each of a respective plurality of output channels, the location filters generated from the gain location vectors;
instructions to adjust the location filters based on a genre identified within external non-audio data included in the audio input signal;
instructions to apply each of the location filters to the audio input signal to form a respective one of a plurality of sound source vectors; and
instructions to identify a respective audio source in each of the sound source vectors.

24. A non-transitory computer readable medium of claim 23, further comprising instructions to identify a respective audio source in each of the sound source vectors, and instructions to separately and independently process each of the sound source vectors in accordance with the identified respective audio source.

25. A non-transitory computer readable medium of claim 24, further comprising instructions to independently process each of the sound source vectors, and instructions to assemble the sound source vectors to form an audio output signal, the audio output signal comprising a plurality of audio output channels configured to independently drive respective loudspeakers.

26. A non-transitory computer readable medium of claim 23, where instructions to generate a plurality of gain location vectors comprises instructions to convert the audio input signal to the frequency domain and to divide the audio input signal into the predetermined bands of frequency.

27. A non-transitory computer readable medium of claim 23, where instructions to apply each of the location filters to the audio input signal comprises instructions to apply each of the gain values in the respective one of the predetermined bands of frequency to a corresponding one of the predetermined bands of frequency of the audio input signal.

28. A non-transitory computer readable medium of claim 23, where instructions to generate a plurality of gain location vectors comprises instructions to generate a gain value for each of the predetermined bands of frequency of the audio input signal in each of the locations.

29. A method of processing an audio signal comprising:
receiving an audio input signal;

dividing the audio input signal into a plurality of sound source location vectors, where each of the sound source location vectors represent a perceptual location across a listener perceived sound stage, and at least some of the sound source location vectors include a source of audible sound included in the audio input signal, the source of audible sound identified based at least in part on external non-audio data included in the audio input signal;

independently modifying the sound source location vectors;

adjusting an area of one or more of the perceptual locations based at least in part on an audio genre detected from, the non-audio data; and assembling the sound source location vectors to create an audio output signal comprising a plurality of audio output channels, each of the audio output channels configured to drive a respective loudspeaker.

30. The method of claim 29, where dividing the audio input signal into a plurality of sound source location vectors comprises dividing the audio input signal into a plurality of predetermined bands of frequency, and generating a plurality of sound source values for each of the predetermined bands of frequency, where each of the sound source vectors is formed from the plurality of sound source values for a particular one of the perceptual locations.

31. The method of claim 29, where dividing the audio input signal into a plurality of sound source location vectors comprises generating a plurality of location filters and applying the audio input signal to the location filters to generate the sound source location vectors.

32. The method of claim 29, where assembling the sound source location vectors to create an audio output signal comprises combining the sound source location vectors to form each of the audio output channels.

33. The method of claim 29, where assembling the sound source location vectors to create an audio output signal comprises forming one of the audio output channels from one of the sound source location vectors.

34. The method of claim 29, where assembling the sound source location vectors to create an audio output signal comprises including one of the sound source location vectors in at least two of the audio output channels.

35. The method of claim 29, where independently modifying the sound source location vectors comprises independently adjusting only the source of audible sound included in a particular one of the sound source location vectors.

36. The method of claim 29, where independently modifying the sound source location vectors comprises independently performing at least one of noise reduction, loudness adjustment, reverberation adjustment, transient enhancement, compression, and frequency equalization of one or more parts of the audio input signal divided into respective one or more sound source location vectors.

37. The method of claim 29, where independently modifying the sound source location vectors comprises moving the source of audible sound included in a first one of the sound source location vectors to a second one of the sound source location vectors.

38. An audio processing system comprising:
a processor configured to receive an audio input signal;
the processor further configured to convert the audio input signal to the frequency domain;
the processor further configured to separate the audio input signal into a plurality of predetermined bands of frequency;
the processor further configured to generate a plurality of gain location vectors, where each of the gain location vectors corresponds to one of a plurality of perceptual locations across a listener perceived sound stage;
the processor further configured to apply the gain location vectors to the audio input signal to separate sources of audible sound included in the audio input signal into the plurality of perceptual locations, the sources of audible sound identified based at least in part on external non-audio data included in the audio input signal, wherein the perceptual location are determined based on an audio genre identified from the external non-audio data;
the processor further configured to separately and independently process the separate sources of audible sound; and
the processor further configured to assemble the separate sources of audible sound to form an audio output signal comprising a plurality of audio output channels.

* * * * *